United States Patent
Kobayashi et al.

(10) Patent No.: US 9,667,616 B2
(45) Date of Patent: May 30, 2017

(54) AUTHENTICATION PROCESSING APPARATUS, AUTHENTICATION PROCESSING SYSTEM, AUTHENTICATION PROCESSING METHOD AND AUTHENTICATION PROCESSING PROGRAM

(71) Applicants: Nobuhiro Kobayashi, Tokyo (JP); Tsutomu Sakagami, Tokyo (JP); Manabu Misawa, Tokyo (JP)

(72) Inventors: Nobuhiro Kobayashi, Tokyo (JP); Tsutomu Sakagami, Tokyo (JP); Manabu Misawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 45 days.

(21) Appl. No.: 14/648,776

(22) PCT Filed: Jan. 8, 2013

(86) PCT No.: PCT/JP2013/050066
§ 371 (c)(1),
(2) Date: Jun. 1, 2015

(87) PCT Pub. No.: WO2014/108993
PCT Pub. Date: Jul. 17, 2014

(65) Prior Publication Data
US 2015/0318997 A1    Nov. 5, 2015

(51) Int. Cl.
*H04W 12/08* (2009.01)
*H04L 29/06* (2006.01)
*H04L 9/32* (2006.01)

(52) U.S. Cl.
CPC ........ *H04L 63/0823* (2013.01); *H04L 9/3247* (2013.01); *H04L 9/3268* (2013.01)

(58) Field of Classification Search
CPC ...................................................... H04L 9/32
See application file for complete search history.

(56) References Cited

U.S. PATENT DOCUMENTS

| 9,135,820 B2* | 9/2015 | Ando | H04L 9/3268 |
| 2001/0050990 A1* | 12/2001 | Sudia | G06Q 20/02 |
| | | | 380/286 |

(Continued)

FOREIGN PATENT DOCUMENTS

| JP | 2002-139996 A | 5/2002 |
| JP | 2012 104049 | 5/2012 |

(Continued)

OTHER PUBLICATIONS

International Search Report Issued Feb. 12, 2013 in PCT/JP13/050066 filed Jan. 8, 2013.

(Continued)

*Primary Examiner* — Morshed Mehedi
(74) *Attorney, Agent, or Firm* — Oblon, McClelland, Maier & Neustadt, L.L.P.

(57) ABSTRACT

A communication apparatus sends a processing request, including request information, a digital signature, and an electronic certificate, to a control apparatus. The control apparatus sends a verification request including the electronic certificate to a verification server. The verification server verifies the electronic certificate included in the verification request, and sends authentication-use reference information, including the verification result, as a verification response, to the control apparatus. When the verification result included in the authentication-use reference information indicates validity, the control apparatus, using the request information and a public key included in the electronic certificate, verifies whether or not the digital signature is valid. When the digital signature is valid, the control apparatus performs the requested processing in accordance (Continued)

with the request information, and sends a processing response, to the communication apparatus.

5 Claims, 18 Drawing Sheets

(56) References Cited

U.S. PATENT DOCUMENTS

| | | | |
|---|---|---|---|
| 2006/0179297 A1* | 8/2006 | Ikebe | H04L 63/126 713/153 |
| 2009/0214042 A1* | 8/2009 | Nakahara | G06F 21/10 380/278 |
| 2011/0264918 A1* | 10/2011 | Nagura | H04L 9/3247 713/179 |
| 2013/0227650 A1 | 8/2013 | Miyake | |

FOREIGN PATENT DOCUMENTS

| | | |
|---|---|---|
| WO | WO 2011/148744 A1 | 12/2011 |
| WO | 2012 090448 | 7/2012 |
| WO | 2012 153530 | 11/2012 |

OTHER PUBLICATIONS

Umezawa, K. et al., "A Study on User Authentication Infrastructure for Telematics", IEICE Technical Report, ITS2007-58, IE2007-241, vol. 107, No. 486, pp. 133-138, 2008 (with English abstract).

Kiyomoto, S. et al., "Development of Security Functions for a Medical Information Sharing Platform", Journal of Electronics, Information and Communication Engineers, The institute of Electronics, Information and Communication Engineers, vol. J88-D-I, No. 2, pp. 378-390, 2005.

Kobayashi, N. et al., "A Proposal of telematics security system", The 30$^{th}$ Symposium on Cryptography and Information Security, The institute of Electronics, Information and Communication Engineers, (7 pages), 2013.

Office Action issued on Jan. 19, 2016 in Japanese Patent Application No. 2014-556235 with partial English translation.

Office Action issued on Jun. 21, 2016 in Japanese Patent Application No. 2014-556235 (with partial English translation).

* cited by examiner

Fig. 8

395:CERTIFICATE

| BASIC AREA | VERSION<br>SERIAL NUMBER<br>SIGNATURE ALGORITHM<br>ISSUER NAME<br>VALIDITY PERIOD<br>SUBJECT NAME<br>PUBLIC KEY<br>ISSUER UNIQUE IDENTIFIER<br>SUBJECT UNIQUE IDENTIFIER | |
|---|---|---|
| EXTENSIONS | BASIC AREA | AUTHORITY KEY IDENTIFIER<br><br>SUBJECT KEY IDENTIFIER<br><br>KEY USAGE<br><br>PRIVATE KEY USEAGE PERIOD<br><br>CERTIFICATE POLICY<br><br>POLICY MAPPING<br><br>SUBJECT ALTERNATIVE NAME<br><br>ISSUER ALTERNATIVE NAME<br><br>BASIC CONSTRAINTS<br><br>REVOCATION LIST<br>DISTRIBUTION POINT<br>: |
| | PERSONAL AREA | (OPTIONAL) |
| SIGNATURE OF ISSUER (CA) | | |

AUTHENTICATION PROCESSING APPARATUS, AUTHENTICATION PROCESSING SYSTEM, AUTHENTICATION PROCESSING METHOD AND AUTHENTICATION PROCESSING PROGRAM

TECHNICAL FIELD

The present invention relates to an authentication processing apparatus, an authentication processing system, an authentication processing method and an authentication processing program which are designed for distributed authentication processing, for example.

BACKGROUND ART

FIG. 19 is a brief overview of a configuration and processing disclosed in Patent Document 1.

An in-vehicle network system 990 disclosed in Patent Document 1 includes an in-vehicle control device 991, a communication device 992 and an authentication server 993 which communicate with each other over a network 999.

The in-vehicle control device 991 is equipped with a memory for storing data.

The communication device 992 issues a read request or a write request (hereafter, referred to as a processing request) of data to the memory of the in-vehicle control device 991, to the in-vehicle control device 991.

The authentication server 993 is a device to authenticate the communication device 992.

The authentication server 993, prior to the issuance of the processing request by the communication device 992, performs authentication of the communication device 992 and holds an authentication result of the communication device 992.

The in-vehicle control device 991, upon receipt of the processing request from the communication device 992, refers to the authentication server 993 for the authentication result of the communication device 992, and obtains the authentication result of the communication device 992. When the authentication result indicates that the communication device 992 is authenticated, the in-vehicle control device 991 accepts the processing request. When the authentication result indicates that the communication device 992 is not authenticated, the in-vehicle control device 991 rejects the processing request.

Further, the in-vehicle control device 991 checks periodically whether or not a connection is established with the authentication server 993 for communication. When a connection is not established with the authentication server 993 for communication, the in-vehicle device 991 rejects the processing request from the communication device 992.

The in-vehicle network system 990 described above poses problems as follows.

It is required that the authentication server 993 completes authentication of the communication device 992 prior to the issuance of the processing request from the communication device 992. More specifically, authentication processing should be done in advance between the authentication server 993 and the communication device 992. This requires a communication means for communication between the authentication server 993 and the communication device 992.

It is also required that the authentication server 993 holds authentication results.

Consequently, the authentication server 993 and the communication device 992 are required to increase and enhance the processing capacity and functions, and thereby the cost is increased.

Secondly, when a connection is not established between the authentication server 993 and the in-vehicle control device 991 for communication, the processing request from the communication device 992 is rejected. Thus, the processing request of the communication device 992 has to stay rejected while communication is not available between the authentication server 993 and the in-vehicle control device 991.

Also, in case of an authentication server 993 failure, the processing request from the communication device 992 has to stay rejected.

Assume that the authentication server 993 is connected to an external network, for example. If radio interference occurs as a vehicle equipped with the in-vehicle control device 991 is moving through a remote area or a tunnel, communication won't be available with the authentication server 993 via the external network, and the processing request from the communication device 992 will be rejected.

This will reduce system availability, which may cause a vehicle breakdown and eventually an accident.

Thirdly, the authentication processing of the communication device 992 is inseparable from response processing for responding with an authentication result.

This prevents processing from being distributed or multiplexed, and thereby restricting flexibility to improve system availability and processing capacity.

CITATION LIST

Patent Literature

Patent Document 1: JP 2012-104049 A

SUMMARY OF INVENTION

Technical Problem

An objective of the present invention is to implement distributed authentication processing, for example.

Solution to Problem

An authentication processing apparatus according to the present invention is designed for an authentication processing system which includes a target device that generates target information to be authenticated, a certificate verifying apparatus that verifies an electronic certificate for the target device, and the authentication processing apparatus that, using a verification result by the certificate verifying apparatus, authenticates the target information.

The certificate verifying apparatus received from the authentication processing apparatus certificate information relating to the electronic certificate for the target device, verifies whether or not the electronic certificate for the target device is valid with reference to verification-use reference information stored in advance, generates authentication-use reference information which includes the verification result, and sends the authentication-use reference information to the authentication processing apparatus.

The authentication processing apparatus includes:
a target-information receiving section that receives the target information, a digital signature for the target information, and the certificate information, from the target device;

a certificate-verification requesting section that sends the certificate information received by the target-information receiving section to the certificate verifying apparatus, and receives authentication-use reference information from the certificate verifying apparatus; and a signature verifying section, when the verification result included in the authentication-use reference information received by the certificate-verification requesting section indicates validity, using a public key of the target device, which is included in the electronic certificate for the target device, and the target information received by the target-information receiving section, verifies whether or not the digital signature for the target information received by the target-information receiving section is valid.

Advantageous Effects of Invention

According to the present invention, authentication processing can be performed in a distributed manner, for example.

BRIEF DESCRIPTION OF DRAWINGS

FIG. 8 illustrates an example of a certificate 395 according to the first embodiment.

DESCRIPTION OF EMBODIMENTS

Embodiment 1

An embodiment is described in which system availability is improved by distributing authentication processing.

Figure 1:
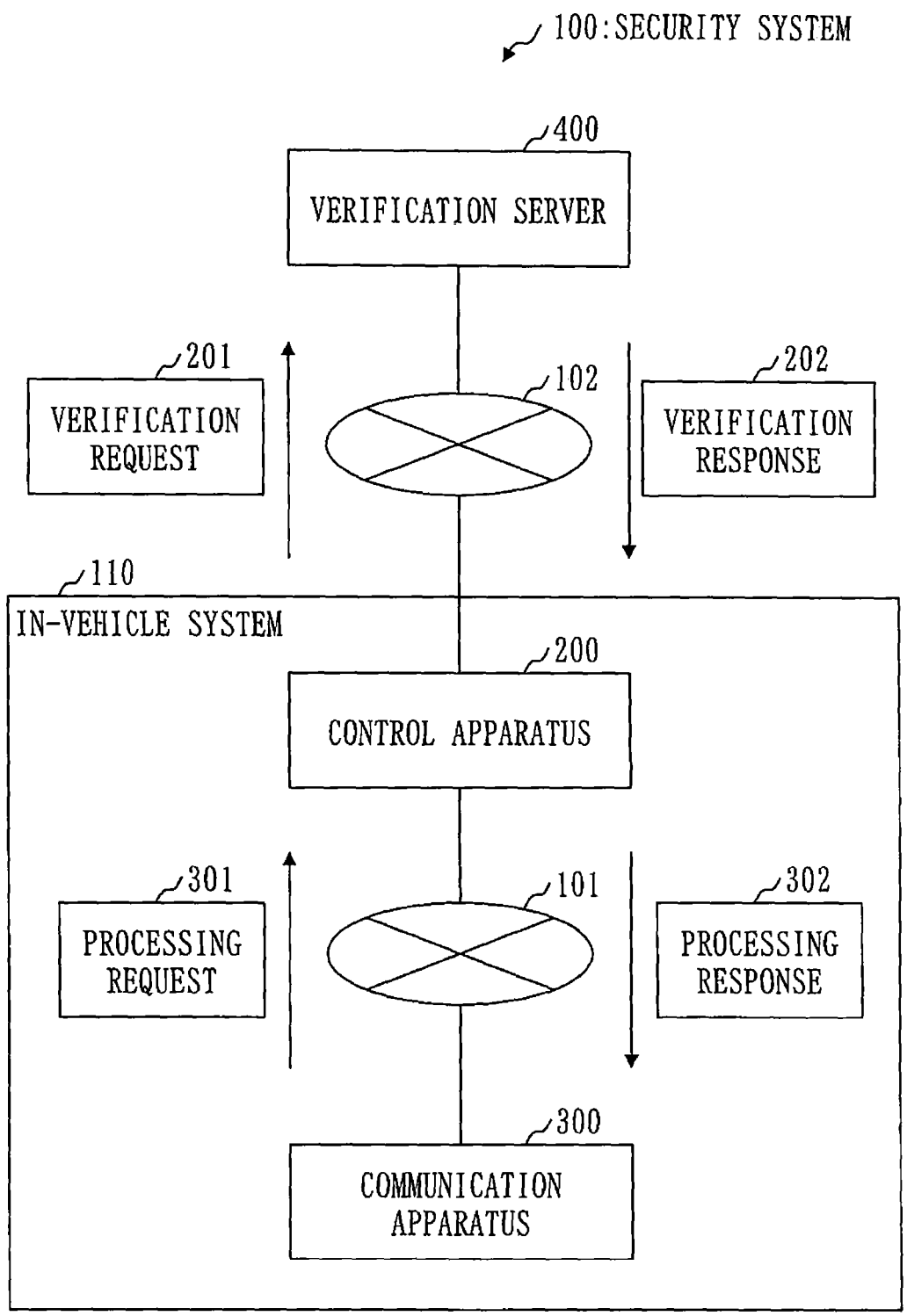
FIG. 1 is a brief overview of a security system 100 according to a first embodiment.

FIG. 1 is a brief overview of a security system 100 according to a first embodiment.

The security system 100 of the first embodiment is outlined with reference to FIG. 1.

The security system 100 is an example of an information processing system (referred to also as an authentication processing system, a computer system or a network system) which performs requested processing after authentication processing.

The security system 100 includes a control apparatus 200 (an example of an authentication processing apparatus), a communication apparatus 300 (an example of a target device) and a verification server 400 (an example of a certificate verifying apparatus).

The control apparatus 200 and the communication apparatus 300 are equipped on a vehicle to form an in-vehicle system 110 that controls the vehicle. The verification server 400 is located outside the in-vehicle system 110.

Hereafter, a communication network in the in-vehicle system 110 is referred to as an in-vehicle network 101, and a communication network outside the in-vehicle system 110 is referred to as an external network 102.

The control apparatus 200 communicates with the communication apparatus 300 via the in-vehicle network 101 (e.g., a CAN or a LIN), and with the verification server 400 via the external network 102 (e.g., the Internet or a wireless LAN).

CAN stands for Controller Area Network, LIN stands for Local Interconnect Network, and LAN stands for Local Area Network.

The control apparatus 200 is a vehicle controller (an example of a computer, which shall apply hereafter) for engine control, brake control, air-conditioning control, or the like.

The communication apparatus 300 is a requester to request the control apparatus 200 to perform processing such as control processing for vehicle control, update processing for updating control information for vehicle control, or the like.

The verification server 400 is a generator to generate authentication-use reference information to be used for authentication of a processing request 301 of the communication apparatus 300.

The communication apparatus 300 sends the processing request 301 to the control apparatus 200, and receives a processing response 302 to the processing request 301, from the control apparatus 200.

The control apparatus 200 performs authentication of the processing request 301 of the communication apparatus 300, when the communication apparatus 300 is authenticated, performs processing in accordance with the processing request 301, and sends the processing response 302 to the communication apparatus 300. In addition, the control apparatus 200 sends, to the verification server 400, a verification request 201 which requests the authentication-use reference information to be used for authentication of the processing request 301 of the communication apparatus 300, and receives a verification response 202 including the authentication-use reference information.

The verification server 400 generates the authentication-use reference information in accordance with the verification request 201, and sends the verification response 202 including the generated authentication-use reference information, to the control apparatus 200.

Figure 2:
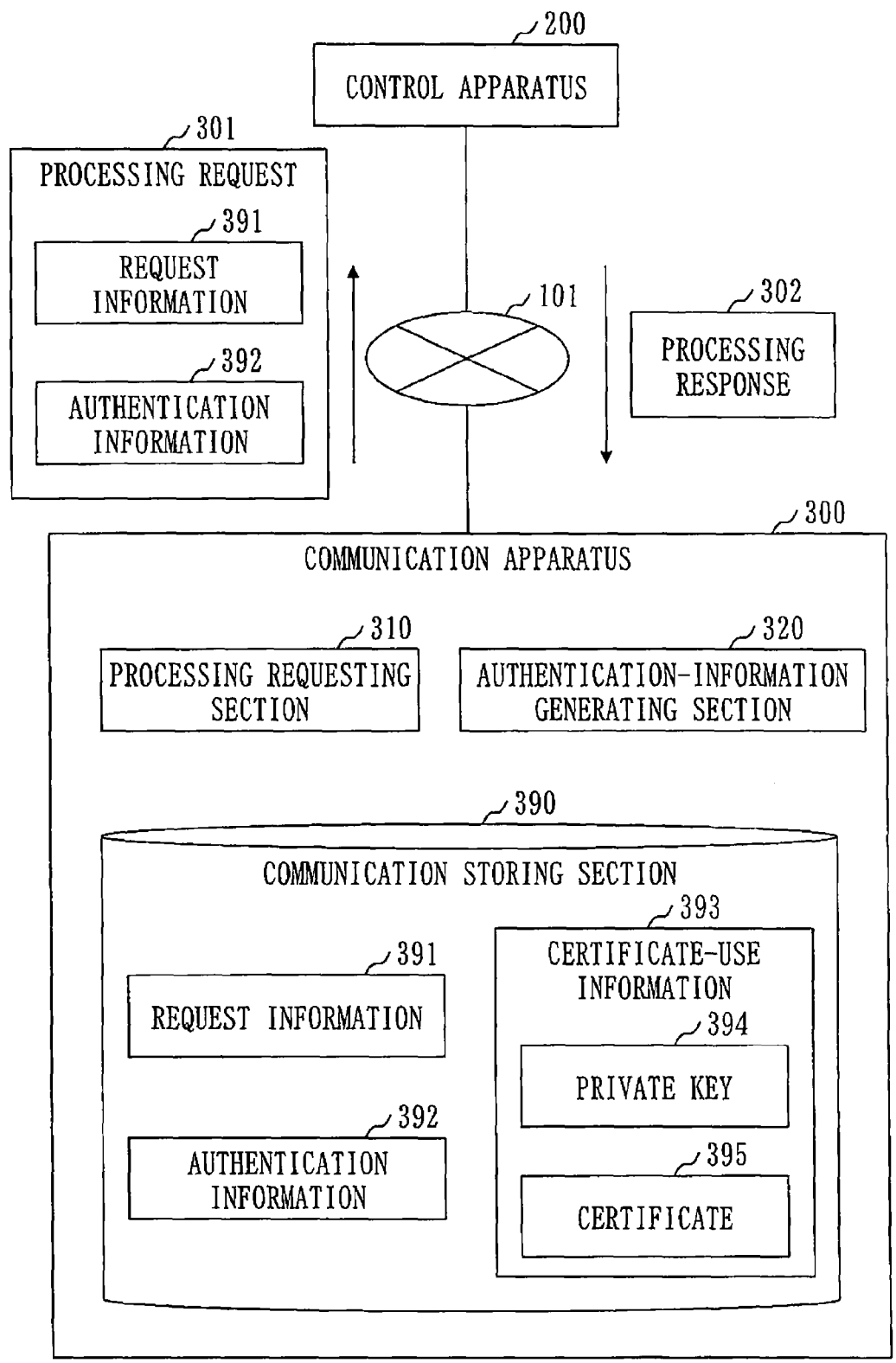
FIG. 2 illustrates a configuration of a communication apparatus 300 according to the first embodiment.

FIG. 2 illustrates a configuration of the communication apparatus 300 according to the first embodiment.

The configuration of the communication apparatus 300 of the first embodiment is described with reference to FIG. 2.

The communication apparatus 300 includes a processing requesting section 310, an authentication-information generating section 320, and a communication storing section 390.

The processing requesting section 310 generates request information 391 that indicates details of the processing to be requested to the control apparatus 200, and sends the processing request 301 including the generated request information 391 and authentication information 392 that is generated by the authentication-information generating section 320, to the control apparatus 200.

The authentication-information generating section 320, using certification-use information 393 that is stored in advance in the communication storing section 390, generates the authentication information 392 to be used for authentication.

The communication storing section 390 stores data to be used in the communication apparatus 300.

For example, the communication storing section 390 stores the request information 391 generated by the processing requesting section 310, the authentication information 392 generated by the authentication-information generating section 320, and the like.

The communication storing section 390 also stores the certification-use information 393 which includes a private key 394 to be used in a public key system, an electronic certificate (hereafter, referred to as a certificate 395), and the like.

Figure 3:
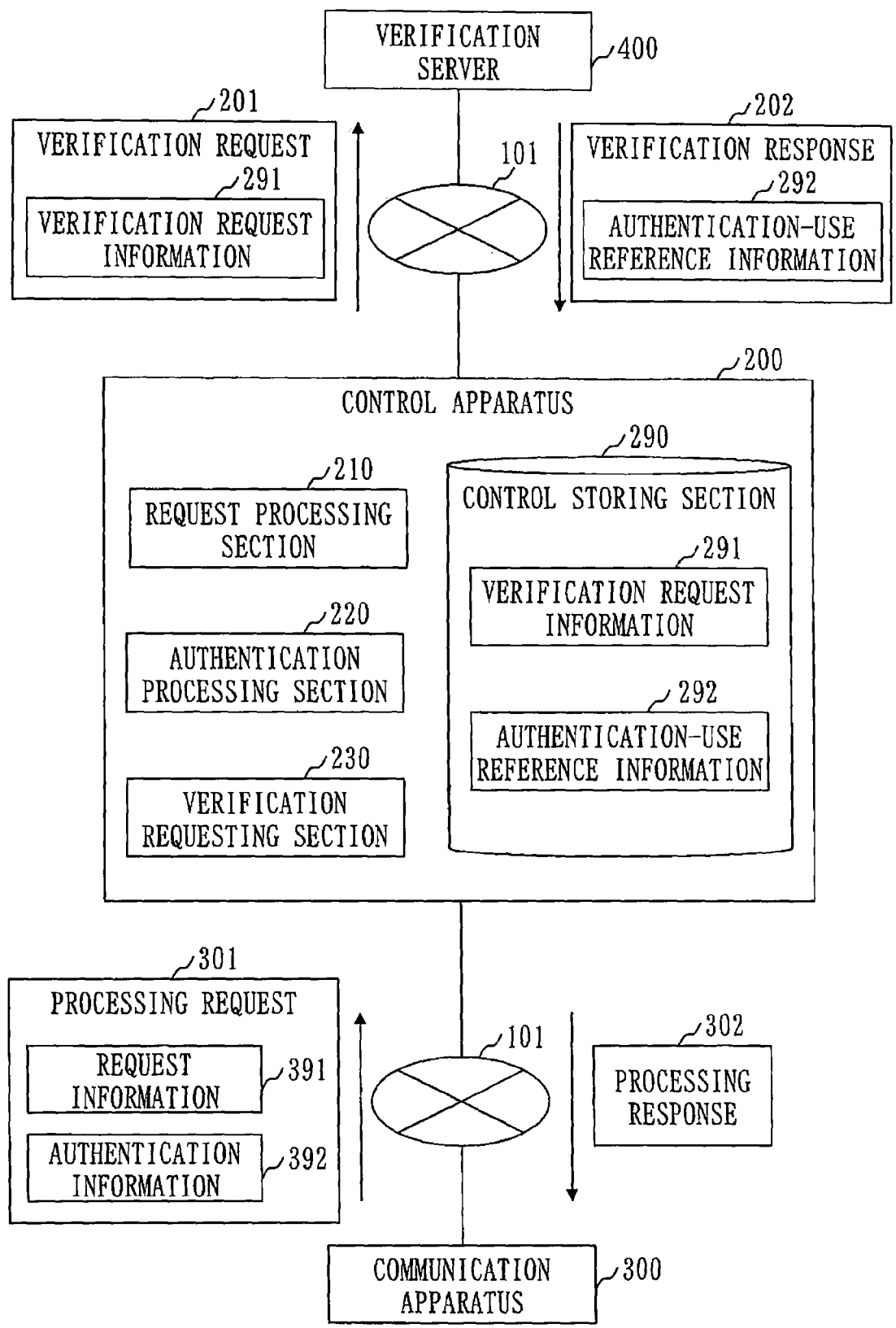
FIG. 3 illustrates a configuration of a control apparatus 200 according to the first embodiment.

FIG. 3 illustrates a configuration of the control apparatus 200 according to the first embodiment.

The configuration of the control apparatus 200 of the first embodiment is described with reference to FIG. 3.

The control apparatus 200 includes a request processing section 210 (an example of a target-information receiving section), an authentication processing section 220 (an example of a signature verifying section or an authentication-use reference information searching section), a verification requesting section 230 (an example of a certificate-verification requesting section), and a control storing section 290 (an example of an authentication-use reference information storing section).

The request processing section 210 receives the processing request 301 from the control apparatus 200. When the communication apparatus 300 is authenticated by the authentication processing section 220, the request processing section 210 performs processing in accordance with the request information 391 included in the processing request 301, and sends the processing response 302 including a processing result, to the control apparatus 200.

The authentication processing section 220, using authentication-use reference information 292 which is stored in the control storing section 290, performs authentication of the processing request 301 of the communication apparatus 300.

The verification requesting section 230, when there is no authentication-use reference information 292 to be used for authentication of the processing request 301 of the communication apparatus 300, sends the verification request 201 which includes verification request information 291 which is used for generating the authentication-use reference information 292, to the verification server 400, and receives the verification response 202 including the authentication-use reference information 292.

The control storing section 290 stores data to be used in the control apparatus 200.

For example, the control storing section 290 stores the verification request information 291 generated by the verification requesting section 230, the authentication-use reference information 292 obtained by the verification requesting section 230, and the like.

Figure 4:
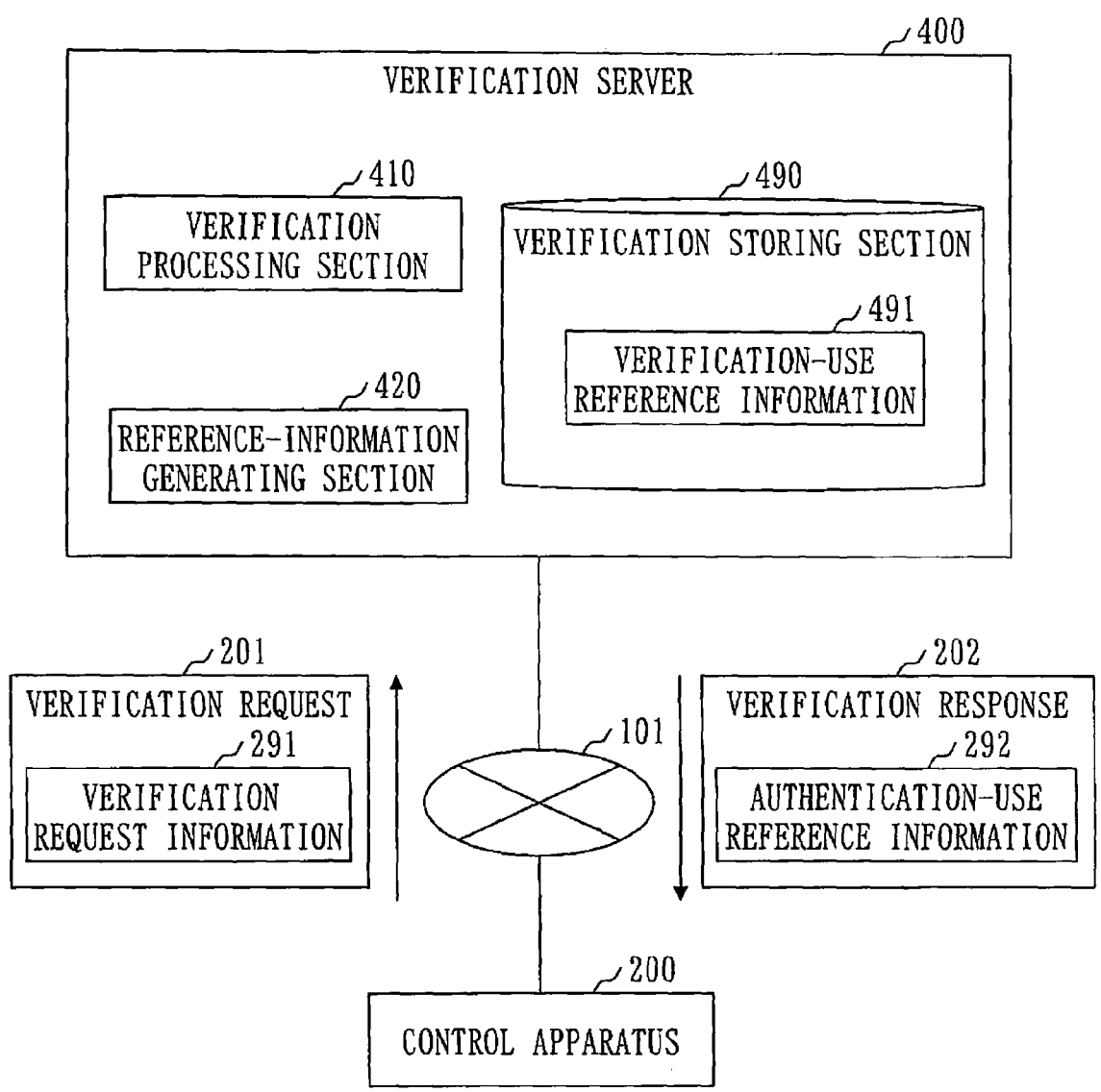
FIG. 4 illustrates a configuration of a verification server 400 according to the first embodiment.

FIG. 4 illustrates a configuration of the verification server 400 according to the first embodiment.

The configuration of the verification server 400 of the first embodiment is described with reference to FIG. 4.

The verification server 400 includes a verification processing section 410, a reference-information generating section 420, and a verification storing section 490.

The verification processing section 410 receives the verification request 201 from the control apparatus 200, and, using verification-use reference information 491, performs verification of the verification request information 291 included in the verification request 201. The verification processing section 410 also sends the verification response 202 including the authentication-use reference information 292 generated by the reference-information generating section 420, to the control apparatus 200.

The reference-information generating section 420 generates the certification-use reference information 292 based on a verification result of the verification processing section 410.

The verification storing section 490 stores data to be used in the verification server 400.

For example, the verification storing section 490 stores in advance the verification-use reference information 491 to be used for verification.

Figure 5:
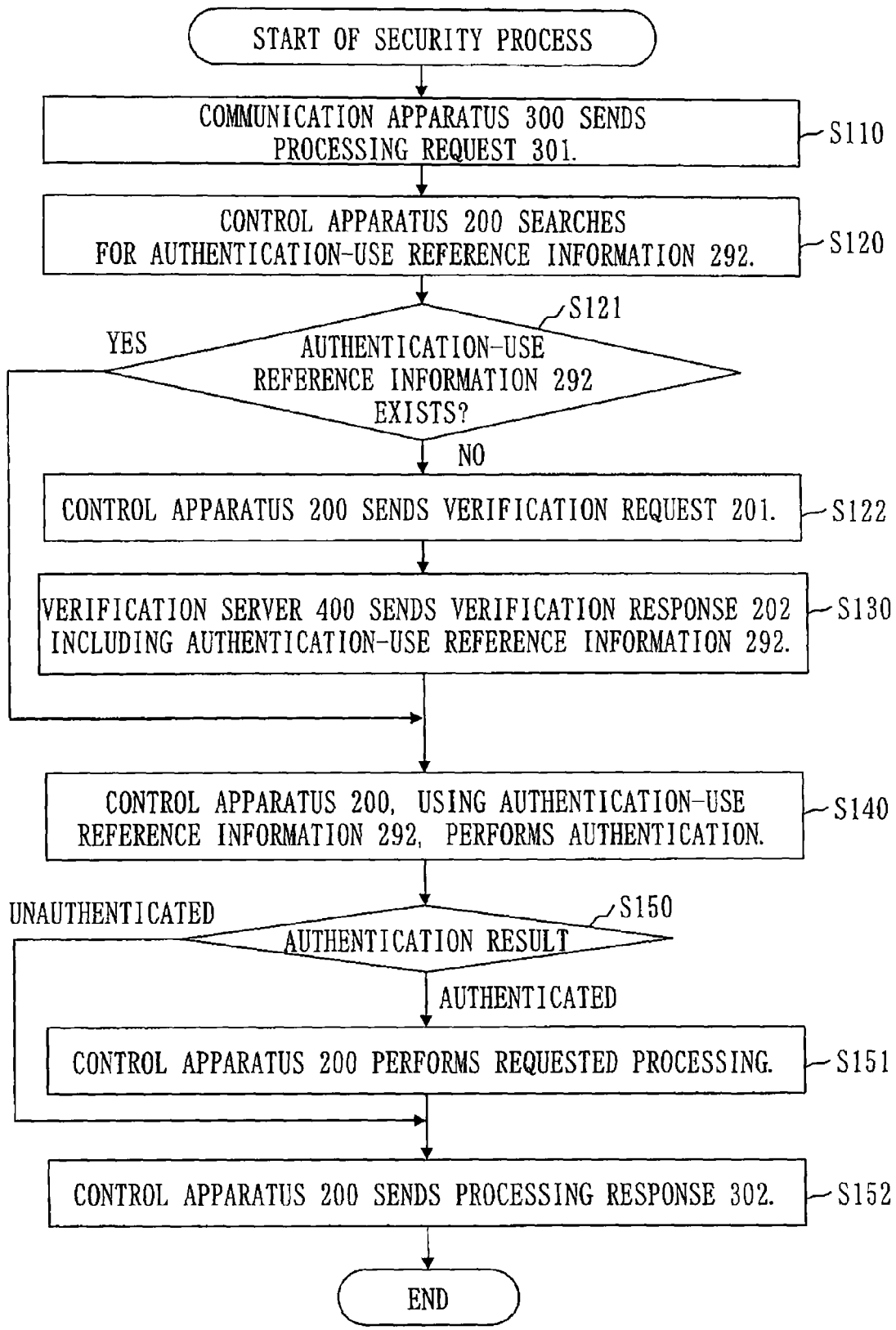
FIG. 5 is a flow chart illustrating a security process according to the first embodiment.

FIG. 5 is a flow chart illustrating a security process according to the first embodiment.

The security process performed by the security system 100 is described with reference to FIG. 5.

First, the security process is outlined.

The communication apparatus 300 sends the processing request 301 to the control apparatus 200, and the control apparatus 200 receives the processing request 301 (S110).

The control apparatus 200 searches for the authentication-use reference information 292 to be used for authentication of the processing request 301 of the communication apparatus 300 (S120).

When there is no authentication-use reference information 292 (S121: NO), the control apparatus 200 sends the verification request 201, to the verification server 400, and the verification server 400 receives the verification request 201 (S122).

The verification server 400 sends the verification response 202 including the authentication-use reference information 292, and the control apparatus 200 receives the verification response 202 (S130).

The control apparatus 200, using the authentication-use reference information 292, performs authentication of the processing request 301 of the communication apparatus 300 (S140).

When the processing request 301 of the communication apparatus 300 is authenticated (S150: AUTHENTICATED), the control apparatus 200 performs processing requested by the processing request 301 (S151).

The control apparatus 200 sends the processing response 302 to the processing request 301, to the communication apparatus 300, and the communication apparatus 300 receives the processing response 302 (S152).

Now, the security process is described in detail.

Referring to S110, the communication apparatus 300 sends the processing request 301, to the control apparatus 200, and the control apparatus 200 receives the processing request 301.

Figure 6:
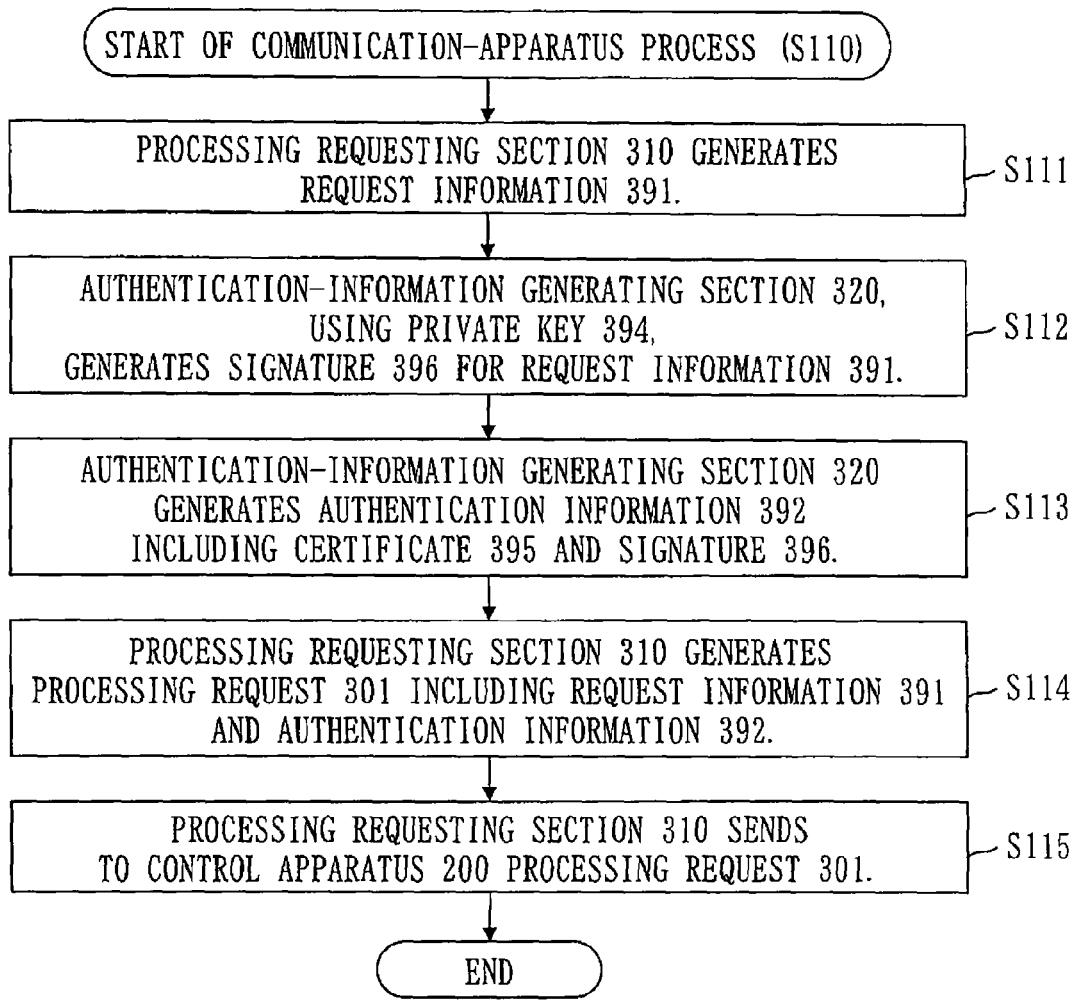
FIG. 6 is a flow chart illustrating a communication-apparatus process (S110) according to the first embodiment.

FIG. 6 is a flow chart illustrating a communication-apparatus process (S110) according to the first embodiment.

The communication-apparatus process (S110) of the first embodiment is described with reference to FIG. 6.

The communication apparatus 300 (see FIG. 2) includes the processing requesting section 310 and the authentication-information generating section 320.

In S111, the processing requesting section 310 generates the request information 391 indicating details of requested processing to be requested to the control apparatus 200.

After S111, the process proceeds to S112.

In S112, the authentication-information generating section 320, using the private key 394, generates a digital signature (referred to also as an electronic signature) for the request information 391. Hereafter, the digital signature will be referred to as a digital signature or just a signature.

The following elaborates how the authentication-information generating section 320 generates the digital signature, for example.

The authentication-information generating section 320, using a hash function for signature, calculates a hash value of the request information 391. Then, the authentication-information generating section 320, using the private key 394, encrypts the hash value of the request information 391. The encrypted hash value of the request information 391 is the digital signature.

After S112, the process proceeds to S113.

In S113, the authentication-information generating section 320 generates the authentication information 392 including the digital certificate (certificate 395) which includes a public key, and the digital signature (signature 396) generated at S112.

Alternatively, however, the authentication information 392 may only include part of the information in the certificate 395 (e.g., a public key or a serial number identifying the certificate 395), or may add other items of information about the certificate 395 (e.g., a hash value of the certificate 395).

After S113, the process proceeds to S114.

In S114, the processing requesting section 310 generates the processing request 301 including the request information 391 generated at S111 and the authentication information 392 generated at S113.

After S114, the process proceeds to S115.

In S115, the processing requesting section 310 sends the processing request 301 generated at S114, to the control apparatus 200, and the request processing section 210 of the control apparatus 200 (see FIG. 3) receives the processing request 301.

After S115, the communication-apparatus process (S110) is terminated.

Figure 7:
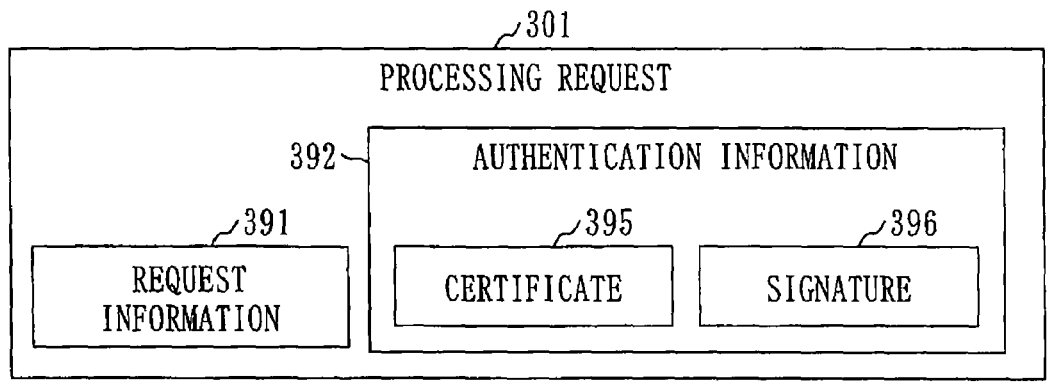
FIG. 7 illustrates a configuration of a processing request 301 according to the first embodiment.

FIG. 7 illustrates a configuration of the processing request 301 according to the first embodiment.

As in FIG. 7, the processing request 301 includes the request information 391 and the authentication information 392.

The authentication information 392 includes the certificate 395 and the signature 396.

FIG. 8 illustrates an example of the certificate 395 according to the first embodiment.

As an example of the certificate 395 of the first embodiment, X.509v3 of the certificate 395 is described with reference to FIG. 8.

The certificate 395 includes a basic area, an extended area, and the signature of an issuer (CA).

In the basic area, set items of information are: the "serial number (an example of an identifier)" for identifying the certificate 395, the "issuer name (an example of an identifier)" for identifying the issuer that has issued the certificate 395, the "validity period" of the certificate 395, the "public key" of the communication apparatus 300, and the like. In this and subsequent embodiments, validity period information indicating a validity period is referred to simply as a validity period. Other items of information set in the basic area are not discussed here.

The extended area includes a basic area, and a personal area in which optional information is set. Items of information to be set in the basic area and the personal area are not discussed here.

The signature of the issuer is a digital signature for the certificate 395, which is generated by the issuer that issues the certificate 395.

Referring back to FIG. 5, the security process is described further.

After S110, the process proceeds to S120.

Referring to S120, the authentication processing section 220 of the control apparatus 200 (see FIG. 3) searches the control storing section 290 for the authentication-use reference information 292 to be used for authentication of the processing request 301 of the communication apparatus 300.

The following elaborates how the authentication processing section 220 searches for the authentication-use reference information 292, for example.

The authentication processing section 220, using a hash function for reference information, calculates the hash value of the certificate 395 included in the processing request 301 (see FIG. 7). The authentication processing section 220 then searches for the authentication-use reference information 292 that includes the same hash value as that of the certificate 395. The hash value is an example of an index value used for searching for the authentication-use reference information 292 or an identifier for identifying the certificate 395.

Alternatively, however, the authentication processing section 220 may search for the authentication-use reference information 292, in a different way from that described above. For example, when the authentication-use reference information 292 includes an electronic certificate or the serial number of an electronic certificate, the authentication processing section 220 may search for the authentication-use reference information 292 which includes the same electronic certificate as the certificate 395 or the same serial number as that of the certificate 395.

After S120, the process proceeds to S121.

In S121, the authentication processing section 220 of the control apparatus 200 determines whether or not there is the authentication-use reference information 292 to be used for authentication of the processing request 301 of the communication apparatus 300, based on a search result at S120.

When there is the authentication-use reference information 292 searched for (YES), the process proceeds to S150.

When there is no authentication-use reference information 292 searched for (NO), the process proceeds to S122.

In S122, the verification requesting section 230 of the control apparatus 200 obtains the certificate 395 from the processing request 301 (see FIG. 7), and generates information including the certificate 395, as the verification request information 291. Alternatively, however, the verification request information 291 may only include part of the information in the certificate 395 (e.g., a serial number or a public key) (see FIG. 8), or may add other items of information about the certificate 395 (e.g., a hash value of the certificate 395).

The verification requesting section 230 then generates the verification request 201 including the verification request information 291, and sends the generated verification request 201, to the verification server 400. The verification server 400 receives the verification request 201.

After S122, the process proceeds to S130.

Referring to S130, the verification server 400 generates the authentication-use reference information 292, and generates the verification response 202 including the generated authentication-use reference information 292.

The verification server 400 then sends the verification response 202, to the control apparatus 200, and the control apparatus 200 receives the verification response 202.

After S130, the process proceeds to S140.

Figure 9:
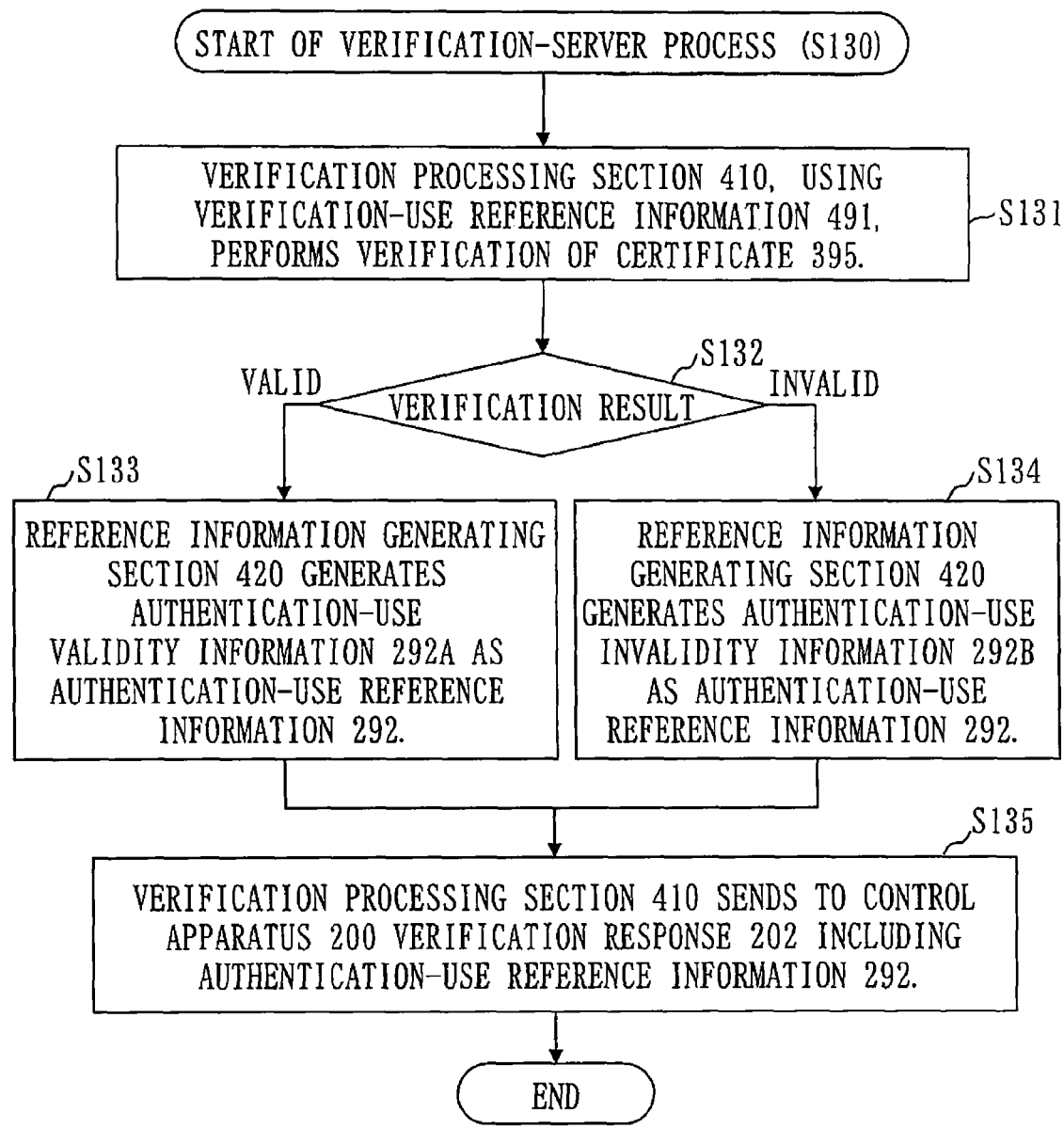
FIG. 9 is a flow chart illustrating a verification-server process (S130) according to the first embodiment.

FIG. 9 is a flow chart illustrating a verification-server process (S130) according to the first embodiment.

The verification-server process (S130) of the first embodiment is described with reference to FIG. 9.

The verification server 400 (see FIG. 4) includes the verification processing section 410 and the reference-information generating section 420.

In S131, the verification processing section 410, using the verification-use reference information 491 and the verification request information 291 included in the verification request 201, performs verification of the certificate 395 for the communication apparatus 300.

The following (1) to (3) elaborate how the verification processing section 410 performs verification, for example.

(1) The verification request information 291 includes the serial number of the certificate 395, and the verification-use reference information 491 is a certificate revocation list (CRL) showing a list of serial numbers of invalid electronic certificates.

The verification processing section 410 searches the certificate revocation list for the serial number of the certificate 395.

When the serial number of the certificate 395 is included in the certificate revocation list, the verification result indicates "invalidity". When the serial number of the certificate 395 is not included in the certificate revocation list, the verification result indicates "validity".

(2) The verification request information 291 includes the serial number of the certificate 395, and the verification-use reference information 491 is a certificate validity list (referred to also as a white list) showing a list of serial numbers of valid electronic certificates.

The verification processing section 410 searches the certificate validity list for the serial number of the certificate 395.

When the serial number of the certificate 395 is included in the certificate validity list, the verification result indicates "validity". When the serial number of the certificate 395 is not included in the certification validity list, the verification result indicates "invalidity".

(3) The verification request information 291 includes the certificate 395, and the verification-use reference information 491 is correspondence information between the issuer name (an example of an identifier) of the issuer that has issued an electronic certificate, and an electronic certificate issued for the issuer.

The verification processing section 410, using the public key of the issuer that has issued the certificate 395 (hereafter, referred to as a first issuer), verifies the certificate 395. More specifically, the verification processing section 410 verifies whether or not the signature (digital signature) included in the certificate 395 is authentic. The verification of the certificate 395 is performed by using a prior art method, and therefore will not be discussed.

Further, the verification processing section 410, using the public key of a second issuer that has issued an electronic certificate for the first issuer, verifies the electronic certificate issued for the first issuer.

Likewise, the verification processing section 410, using the public key of an upper issuer, verifies an electronic certificate issued for a lower issuer.

Lastly, the verification processing section 410, using the public key of the top issuer (referred to also as a route issuer), verifies an electronic certificate issued for the top issuer.

When the certificate 395 and all the electronic certificates for the first issuer to the top issuer are valid, the verification result indicates "validity". When at least one of the certificate 395 and the electronic certificates for the first issuer to the top issuer is invalid, the verification result indicates "invalidity".

After S131, the process proceeds to S132.

In S132, the reference-information generating section 420 determines whether the verification result at S131 indicates "validity" or "invalidity".

When the verification result indicates "validity", the process proceeds to S133.

When the verification result indicates "invalidity", the process proceeds to S134.

In S133, the reference-information generating section 420 generates the authentication-use reference information 292 in which the verification result of the certificate 395 for the communication apparatus 300 indicates "validity".

Hereafter, the authentication-use reference information 292 in which the verification result indicates "validity" will be referred to as "authentication-use validity information 293".

After S133, the process proceeds to S134.

Figure 10:
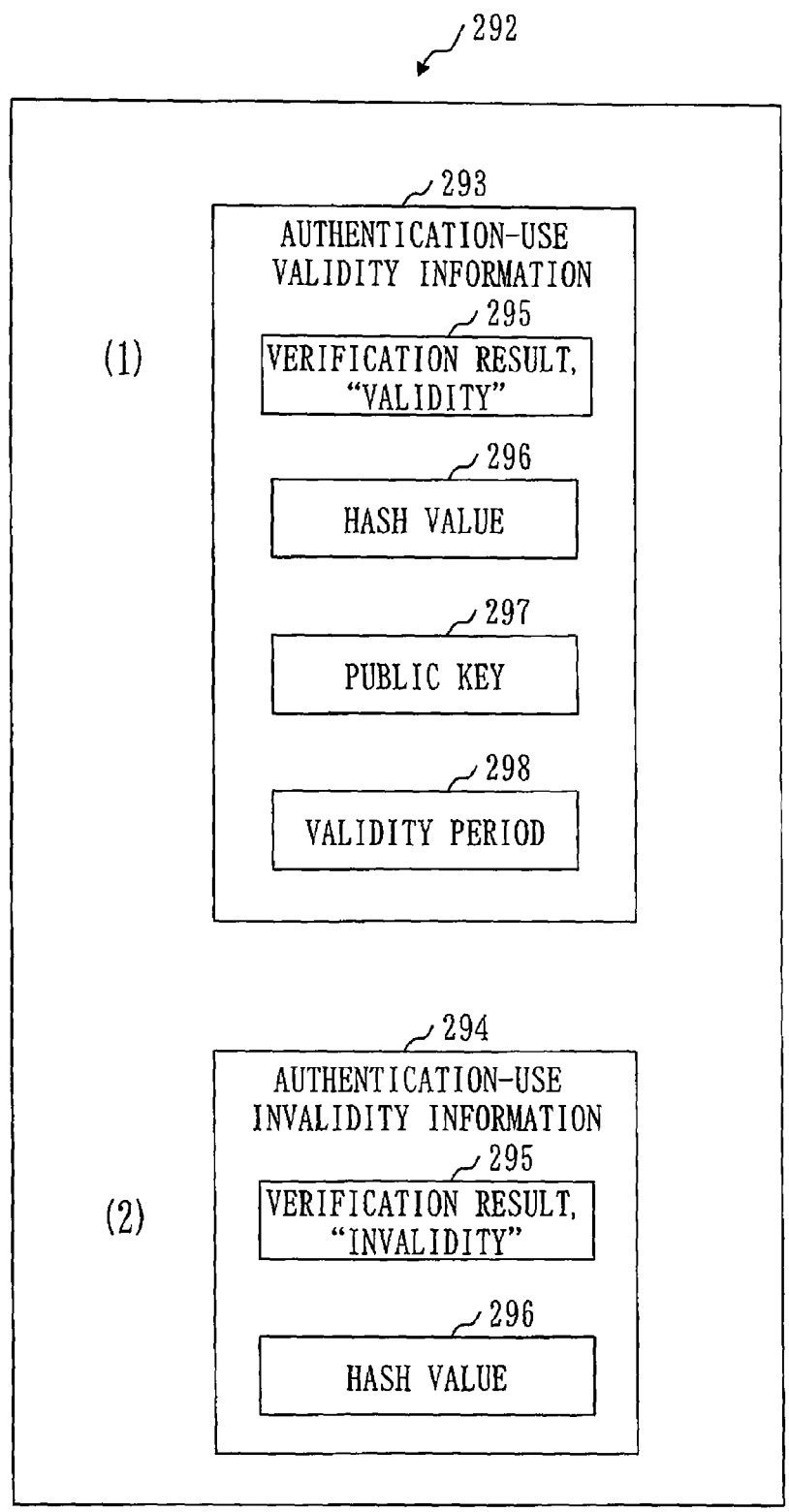
FIG. 10 illustrates an example of authentication-use validity information 293 and authentication-use invalidity information 294, according to the first embodiment.

FIG. 10 illustrates examples of the authentication-use validity information 293 and authentication-use invalidity information 294, according to the first embodiment.

For example, the authentication-use validity information 293 includes a verification result 295, a hash value 296, a public key 297 and a validity period 298 (validity period information indicating a validity period) (see (1) in FIG. 10).

The verification result 295 shows that the verification result of the certificate 395 for the communication apparatus 300 indicates "validity".

The hash value 296 is the hash value of the certificate 395 which is calculated by using a hash function for reference information. The hash value 296 is an example of an identifier to identify the certificate 395. The hash value 296 may be replaced by a different identifier (e.g., the serial number of the certificate 395) to identify the certificate 395.

The public key 297 shows the public key of the communication apparatus 300 that is set in the certificate 395. When the public key is encoded, the reference-information generating section 420 may decode the public key.

The validity period 298 shows the information that indicates a validity period which is set in the certificate 395. When the validity period 298 is encoded, the reference-information generating section 420 may decode the validity period 298.

Alternatively, however, the authentication-use validity information 293 may not include part of the information (e.g., the public key 297 or the validity period 298), or add other items of information (e.g., the certificate 395 or a validity period of the authentication-use validity information 293).

Referring back to FIG. 9, the verification-server process (S130) is described further.

In S134, the reference-information generating section 420 generates the authentication-use reference information 292 in which the verification result of the certificate 395 for the communication apparatus 300 indicates "invalidity".

Hereafter, the authentication-use reference information 292 in which the verification result indicates "invalidity" will be referred to as the "authentication-use invalidity information 294".

For example, the authentication-use invalidity information 294 (see (2) in FIG. 10) includes the verification result 295 (invalidity) and the hash value 296.

The hash value 296 is an example of an identifier to identify the certificate 395. The hash value 296 may be replaced by a different identifier to identify the certificate 395 (e.g., the serial number of the certificate 395).

The authentication-use invalidity information 294 may include other items of information (e.g., a validity period of the authentication-use invalidity information 294).

After S134, the process proceeds to S135.

In S135, the verification processing section 410 generates the verification response 202 including the authentication-use reference information 292 (the authentication-use validity information 293 or the authentication-use invalidity information 294) generated at S133 or S134.

The verification processing section 410 then sends the verification response 202, to the control apparatus 200, and the control apparatus 200 receives the verification response 202.

After S135, the verification-server process (S130) is terminated.

Referring back to FIG. 5, the security process is described further.

Referring to S140, the authentication processing section 220 of the control apparatus 200 (see FIG. 3), using the authentication-use reference information 292 retrieved at S120 or the authentication-use reference information 292 generated at S130, performs authentication of the processing request 301 of the communication apparatus 300.

After S140, the process proceeds to S150.

Figure 11:
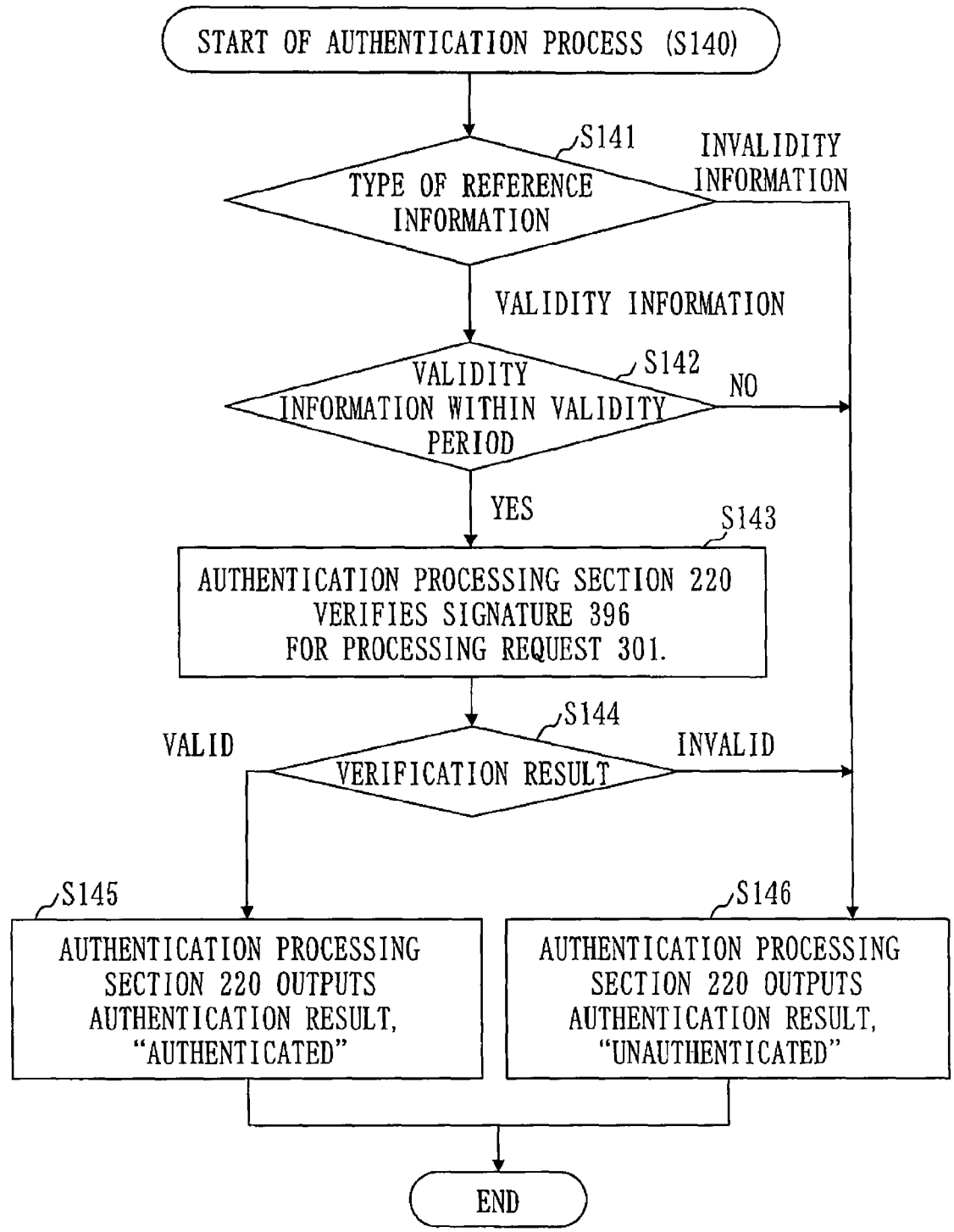
FIG. 11 is a flow chart illustrating an authentication process (S140) according to the first embodiment.

FIG. 11 is a flow chart illustrating an authentication process (S140) according to the first embodiment.

The authentication process (S140) of the first embodiment is described with reference to FIG. 11.

In S141, the authentication processing section 220 determines whether the authentication-use reference information 292 is the authentication-use validity information 293 or the authentication-use invalidity information 294.

When the verification result 295 included in the authentication-use reference information 292 indicates "validity", the authentication-use reference information 292 is the authentication-use validity information 293 (see (1) in FIG. 10).

When the verification result 295 included in the authentication-use reference information 292 indicates "invalidity", the authentication-use reference information 292 is the authentication-use invalidity information 294 (see (2) in FIG. 10).

When the authentication-use reference information 292 is the authentication-use validity information 293, the process proceeds to S142.

When the authentication-use reference information 292 is the authentication-use invalidity information 294, the process proceeds to S146.

In S142, the authentication processing section 220 determines whether or not the authentication-use validity information 293 is within the validity period.

When the present date falls within the validity period 298 included in the authentication-use validity information 293 (see (1) in FIG. 10), the authentication-use validity information 293 is considered to be unexpired information.

When the present date does not fall within the validity period 298 included in the authentication-use validity information 293, the authentication-use validity information 293 is considered to be expired information.

When the authentication-use validity information 293 is unexpired information (YES), the process proceeds to S143.

When the authentication-use validity information 293 is expired information (NO), the process proceeds to S146.

When the authentication-use validity information 293 is the type of information that does not include a validity period, S142 is skipped and the process proceeds to S143.

In 143, the authentication processing section 220, using the public key 297 of the communication apparatus 300, verifies the signature 396 included in the processing request 301.

The following elaborates how the authentication processing section 220 verifies the signature 396, for example.

The authentication processing section 220, using a hash function for signature, calculates the hash value of the request information 391 included in the processing request 301 (see FIG. 7).

The authentication processing section 220, using the public key 297 of the communication apparatus 300, decodes the signature 396 included in the processing request 301. Hereafter, a value obtained from decoding the signature 396 will be referred to as a "decoded value".

The authentication processing section 220 compares the hash value of the request information 391 and the decoded value of the signature 396.

When the value of the hash value of the request information 391 and the decoded value of the signature 396 match, the verification result indicates "validity".

When the value of the hash value of the request information 391 and the decoded value of the signature 396 do not match, the verification result indicates "invalidity".

For example, the authentication processing section 220 obtains the public key 297 of the communication apparatus 300 from the authentication-use validity information 293 (see (1) in FIG. 10) or the certificate 395 (see FIG. 8) included in the processing request 301.

When the public key 297 is encoded, the authentication processing section 220 decodes the public key 297 to be used.

After S143, the process proceeds to S144.

In S144, the authentication processing section 220 determines whether the verification result at S143 indicates "validity" or "invalidity".

When the verification result indicates "validity", the process proceeds to S145.

When the verification result indicates "invalidity", the process proceeds to S146.

In S145, the authentication processing section 220 outputs an authentication result indicating being "authenticated", which indicates that the processing request 301 of the communication apparatus 300 is authenticated.

After S145, the authentication process (S140) is terminated.

In S146, the authentication processing section 220 outputs an authentication result indicating being "unauthenticated", which indicates that the processing request 301 of the communication apparatus 300 is not authenticated.

After S146, the authentication process (S140) is terminated.

Referring back to FIG. 5, the security processing is described further.

Referring to S150, the request processing section 210 of the control apparatus 200 (see FIG. 3) determines whether the authentication result at S140 indicates being "authenticated" or being "unauthenticated".

When the authentication result indicates being "authenticated", the process proceeds to S151.

When the authentication result indicates being "unauthenticated", the process proceeds to S152.

In S151, the request processing section 210 performs processing (requested processing) whose details are indicated by the request information 391 included in the processing request 301 (see FIG. 7).

After S151, the process proceeds to S152.

In S152, the request processing section 210 generates the processing response 302 to the processing request 301, and sends the generated processing response 302, to the communication apparatus 300.

The following elaborates how the request processing section 210 generates the processing response 302, for example.

When the authentication result indicates being "authenticated" at S150, that is, when the requested processing is performed at S151, the request processing section 210 generates the processing response 302 indicating a processing result of the requested processing.

When the authentication result indicates being "unauthenticated" at S150, that is, when the requested processing is not performed at S151, the request processing section 210 generates the processing response 302 which indicates an authentication error representing that the processing request 301 of the communication apparatus 300 is not authenticated, or a request error representing that the requested processing is not performed.

The processing requesting section 310 of the communication apparatus 300 (see FIG. 2) receives the processing response 302, and performs processing according to the processing response 302. For example, the communication apparatus 300 sends or displays details of the processing response 302.

After S152, the security process is terminated.

Figure 12:
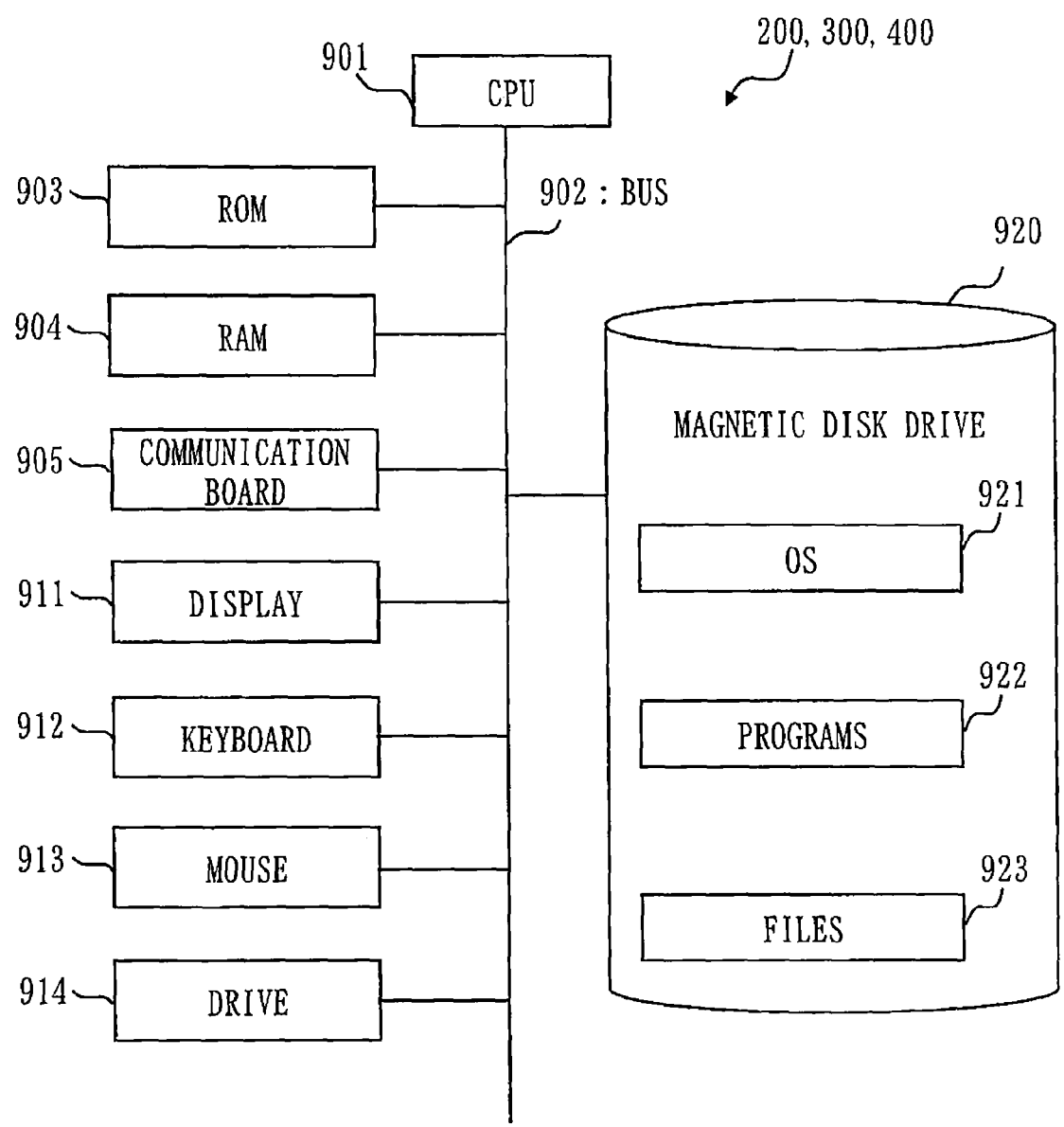
FIG. 12 illustrates an example of hardware resources of the control apparatus 200 according to the first embodiment.

FIG. 12 illustrates an example of the hardware resources of the control apparatus 200 according to the first embodiment.

Referring to FIG. 12, the control apparatus 200 (an example of a computer) is equipped with a CPU 901 (Central Processing Unit). The CPU 901 is connected, via a bus 902, to hardware devices such as a ROM 903, a RAM 904, a communication board 905 (a communication unit), a display 911 (a display unit), a keyboard 912, a mouse 913, a drive 914 and a magnetic disk drive 920, and controls the hardware devices. The drive 914 is a device to write and read data in a storage medium such as an FD (Flexible Disk), a CD (Compact Disc) or a DVD (Digital Versatile Disk).

The ROM 903, the RAM 904, the magnetic disk drive 920 and the drive 914 are examples of storage units. The keyboard 912, the mouse 913, and the communication board 905 are examples of input units. The display 911 and the communication board 905 are examples of output units.

The communication board 905 is connected to a communication network such as a LAN (Local Area Network), the Internet, or a telecommunication line, by wire or wireless connection.

The magnetic disk drive 920 stores an OS 912 (operating system), programs 922 and files 923.

The programs 922 include those for executing the functions that are described each as a "section" in this and subsequent embodiments. A program (e.g., a request processing program) is read and executed by the CPU 901. In other words, a program causes the computer to function as a "section", or causes the computer to execute the procedure or the method of a "section".

The files 923 include various types of data (inputs, outputs, determination results, calculation results, processing results, etc.) which are used in "sections" described in this and subsequent embodiments.

Arrows shown in configuration diagrams and flow charts in this and subsequent embodiments mainly indicate inputs/outputs of data or signals.

Processing described in this and subsequent embodiments with reference to the flow charts and the like is performed by using hardware such as the CPU 901, a storage unit, an input unit, an output unit, or the like.

Anything that is described as a "section" in this and subsequent embodiments may be a "circuit", a "device", or "equipment"; or alternatively, a "step", a "procedure", or "processing". In other words, anything that is described as a "section" may be implemented by firmware, software, hardware, or any combination of them.

The hardware resources of the communication apparatus 300 or the verification server 400 are similar to those of the control apparatus 200.

According to the first embodiment, the control apparatus 200, regardless of the presence or absence of the authentication-use reference information 292, may regularly (every time a predetermined storage period is expired) or at the expiration of the validity period 298 of the authentication-use reference information 292 send the verification request 201 to the verification server 400 and receive the verification response 202 including the authentication-use reference information 292.

More specifically, the control apparatus 200 may delete or keep previously stored old authentication-use reference information 292 at the time when new authentication-use reference information 292 is received.

More specifically, the control apparatus 200 may write new authentication-use reference information 292 over old authentication-use reference information 292, or store new authentication-use reference information 292 additionally.

Alternatively, the control apparatus 200 may delete old authentication-use reference information 292 when new authentication-use reference information 292 is authentication-use invalidity information.

Alternatively, the control apparatus 200 may store one of new authentication-use reference information 292 and old authentication-use reference information 292, which has a validity period that expires later, and delete the other reference information which has a validity period that expires sooner. In other words, the control apparatus 200 may store one of new authentication-use reference information 292 and old authentication-use reference information 292, which has a validity period whose expiration date is far, and delete the other reference information which has a validity period whose expiration date is near.

The following advantageous effects may be achieved according to the first embodiment, for example.

The verification server 400 does not need to perform authentication processing in order to authenticate the communication apparatus 300. Therefore, the verification server 400 does not need to hold authentication results.

In addition, the communication means for communication is not required for communication between the verification server 400 and the communication apparatus 300.

Consequently, there is no need of increasing and enhancing the processing capacity and functions of the verification server 400 and the communication apparatus 300, and thereby the cost is reduced.

The control apparatus 200, in case that the communication with the verification server 400 is interrupted temporarily or continuously, or in case of a verification server 400 failure, can perform authentication of the processing request 301 of the communication apparatus 300, using the authentication-use reference information 292.

Thus, system availability is enhanced, and vehicle safety can be ensured.

When the verification server 400 performs the verification processing and the control apparatus 200 performs the authentication processing, processing can be distributed or multiplexed, and thereby flexibility to enhance system availability and processing capacity can be ensured.

In the first embodiment, the security system 100 is described in relation to the in-vehicle system 110. Alternatively, however, the security system 100 may be designed for any system other than the in-vehicle system 110.

In the first embodiment, an authentication processing apparatus (200) described below is included, for example. Note that numbers and names in parentheses below indicate those of corresponding elements described in the first embodiment.

The authentication processing apparatus includes a target-information receiving section (210), a certificate-verification requesting section (230), and a signature verifying section (220)

The target-information receiving section receives target information (391) to be authenticated, a digital signature (396) of the target information, and certificate information (395) relating to an electronic certificate issued for a target device that generates the target information The certificate-verification requesting section sends the certificate information received by the target-information receiving section, and receives authentication-use reference information (292) including a verification result (295) obtained from verifying whether or not the electronic certificate for the target device is valid.

When the verification result included in the authentication-use reference information received by the certificate-verification requesting section indicates validity, the signature verifying section, using a public key (297) of the target device included in the electronic certificate for the target device and the target information received by the target-information receiving section, verifies whether or not the digital signature for the target information received by the target-information receiving section is valid.

The authentication processing apparatus includes an authentication-use reference information storing section (290) for storing the authentication-use reference information.

When the authentication-use reference information is not stored in the authentication-use reference information storing section, the certificate-verification requesting section sends the certificate information, then receives the authentication-use reference information, and stores the received authentication-use reference information in the authentication-use reference information storing section.

The signature verifying section determines whether or not the verification result included in the authentication-use reference information stored in the authentication-use reference information storing section indicates validity.

The authentication-use reference information includes an index value (296).

The authentication processing apparatus includes an authentication-use reference information searching section (220).

The authentication-use reference information searching section calculates the hash value of the electronic certificate for the target device, and determines whether or not the authentication-use reference information that includes an index value whose value is the same as the value of the calculated hash value is stored in the authentication-use reference information storing section.

The authentication-use reference information includes validity period information (298) that indicates a validity period.

The signature verifying section verifies whether or not the digital signature for the target information is valid when the verification result included in the authentication-use reference information indicates validity and when it is within the validity period indicated by the validity period information included in the authentication-use reference information.

In the first embodiment, an authentication processing system (100) described below is included, for example.

The authentication processing system includes the authentication processing apparatus (200), a target device (300), and a certificate verifying apparatus (400).

The target device sends the target information, the digital signature, and the certificate information, to the authentication processing apparatus.

The certificate verifying apparatus receives the certificate information from the authentication processing apparatus, generates the authentication-use reference information, and sends generated authentication-use reference information to the authentication processing apparatus.

Embodiment 2

Another embodiment is now described in which the processing request is not sent from communication apparatus 300 to the control apparatus 200, but sent from the control apparatus 200 to the communication apparatus 300.

In a second embodiment, the control apparatus 200 performs authentication of the processing response of the communication apparatus 300 in the place of the processing request of the communication apparatus 300. Other portions are similar to those discussed in the first embodiment.

Hereafter, a description is given mainly of different portions from those discussed in the first embodiment. The portions that are not discussed here are considered to be similar to those described in the first embodiment.

Figure 13:
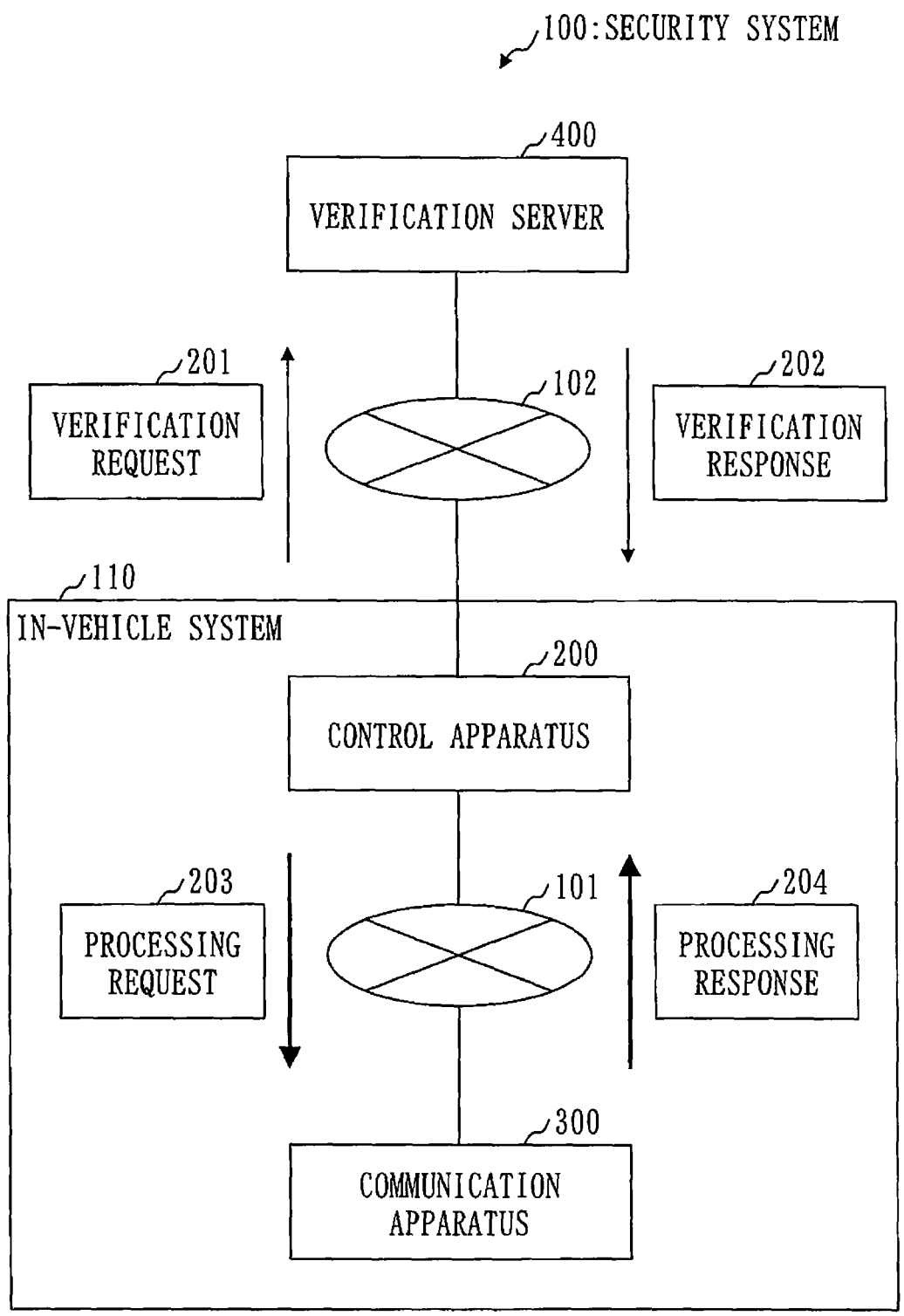
FIG. 13 is a brief overview of the security system 100 according to a second embodiment.

FIG. 13 is a brief overview of the security system 100 according to the second embodiment.

Referring to FIG. 13, the control apparatus 200 sends a processing request 203 to the communication apparatus 300, and the communication apparatus 300 sends a processing response 204 to the processing request 203, to the control apparatus 200.

Figure 14:
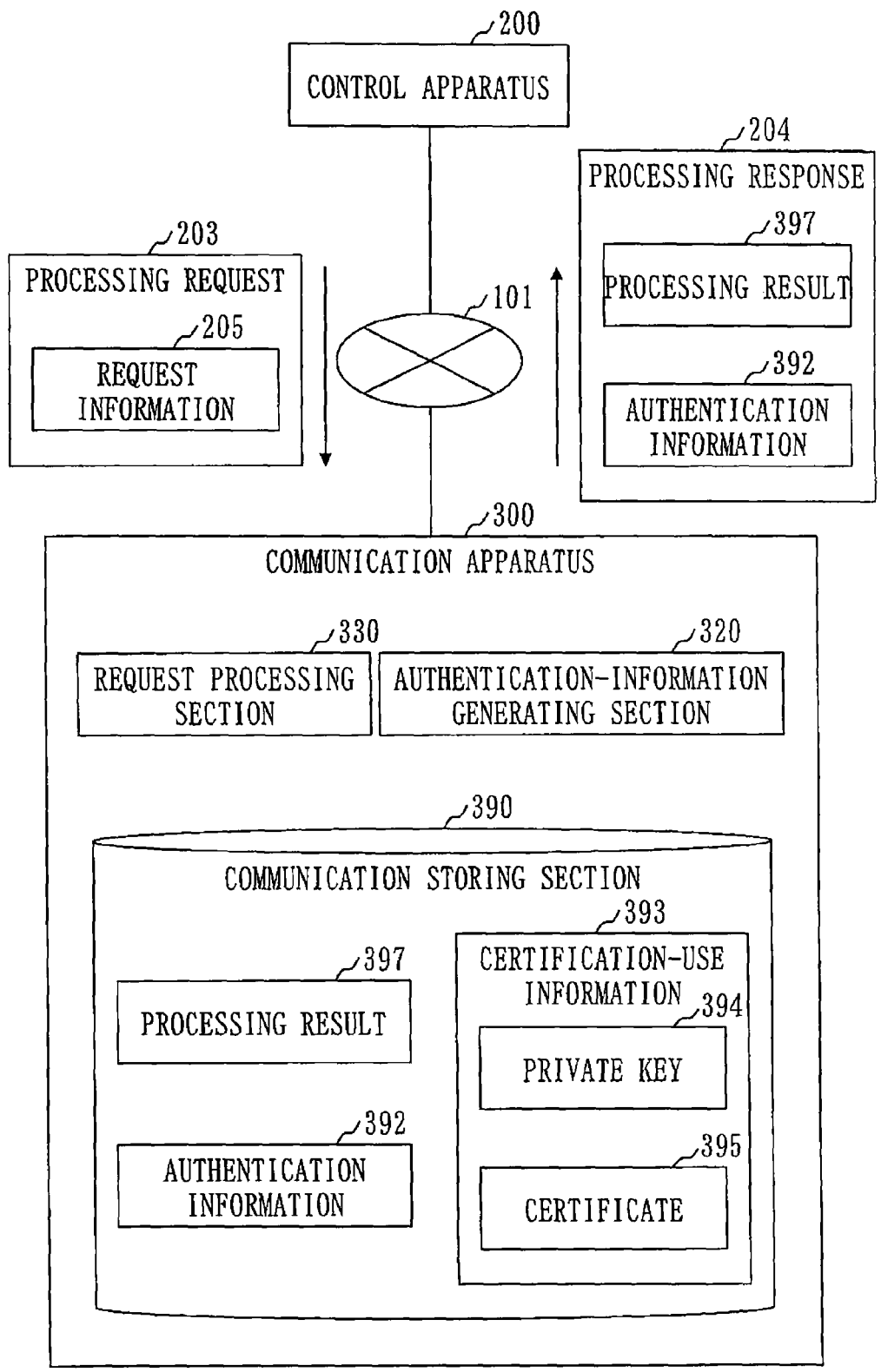
FIG. 14 illustrates a configuration of the communication apparatus 300 according to the second embodiment.

FIG. 14 illustrates a configuration of the communication apparatus 300 according to the second embodiment.

The configuration of the communication apparatus 300 of the second embodiment is discussed with reference to FIG. 14.

The communication apparatus 300 includes a request processing section 330 in the place of the processing requesting section 310 described in the first embodiment (see FIG. 2).

The request processing section 330 receives the processing request 203 from the control apparatus 200, performs requested processing in accordance with request information 205 included in the processing request 203, and generates a processing result 397 of the requested processing.

The request processing section 330 then generates the processing response 204 including the processing result 397 of the requested processing and the authentication information 392 generated by the authentication-information generating section 320, and sends generated processing response 204, to the control apparatus 200.

The authentication-information generating section 320 generates the authentication information 392 in the same manner as that described in the first embodiment.

More specifically, the authentication-information generating section 320 generates a signature for the processing result 397 in the place of the request information 391 described in the first embodiment, and generates the authentication information 392 including the signature for the processing result 397.

Figure 15:
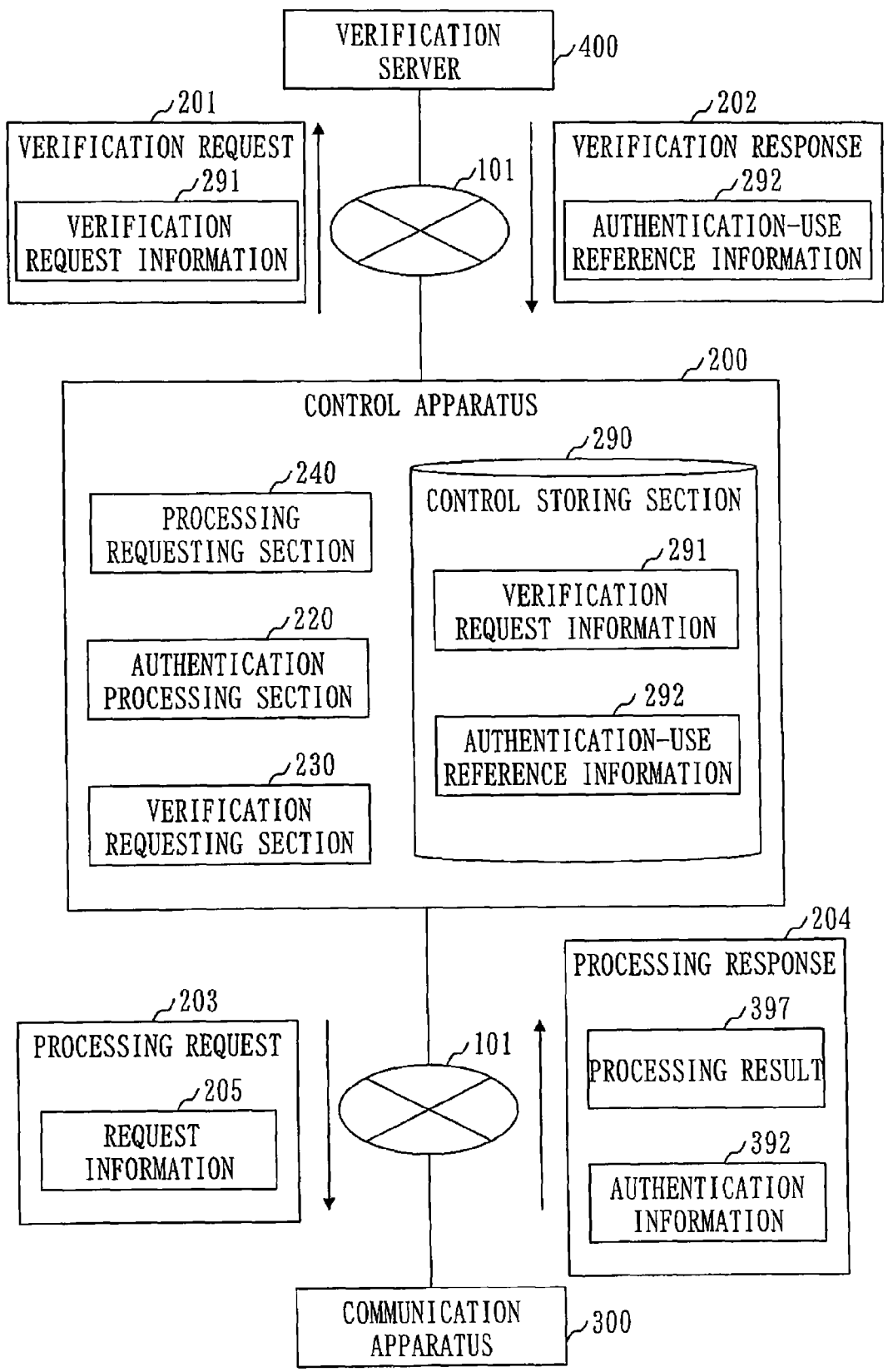
FIG. 15 illustrates a configuration of the control apparatus 200 according to the second embodiment.

FIG. 15 illustrates a configuration of the control apparatus 200 according to the second embodiment.

The configuration of the control apparatus 200 of the second embodiment is described with reference to FIG. 15.

The control apparatus 200 includes a processing requesting section 240 in the place of the request processing section 210 described in the first embodiment (see FIG. 3).

The processing requesting section 240 generates the request information 205 which indicates details of the requested processing which is requested to the communication apparatus 300, generates the processing request 203 including the request information 205, and sends the processing request 203 to the communication apparatus 300.

The processing requesting section 240 also receives the processing response 204 in the place of the processing request 301 described in the first embodiment, from the communication apparatus 300.

The authentication processing section 220 is similar to that described in the first embodiment.

More specifically, the authentication processing section 220 performs authentication of the processing result 397 in the place of the request information 391 described in the first embodiment.

The verification requesting section 230 is similar to that described in the first embodiment.

More specifically, the verification requesting section 230, using the processing response 204 in the place of the processing request 301 described in the first embodiment, generates the verification request 201.

The configuration of the verification server 400 is similar to that described in the first embodiment (see FIG. 4).

Figure 16:
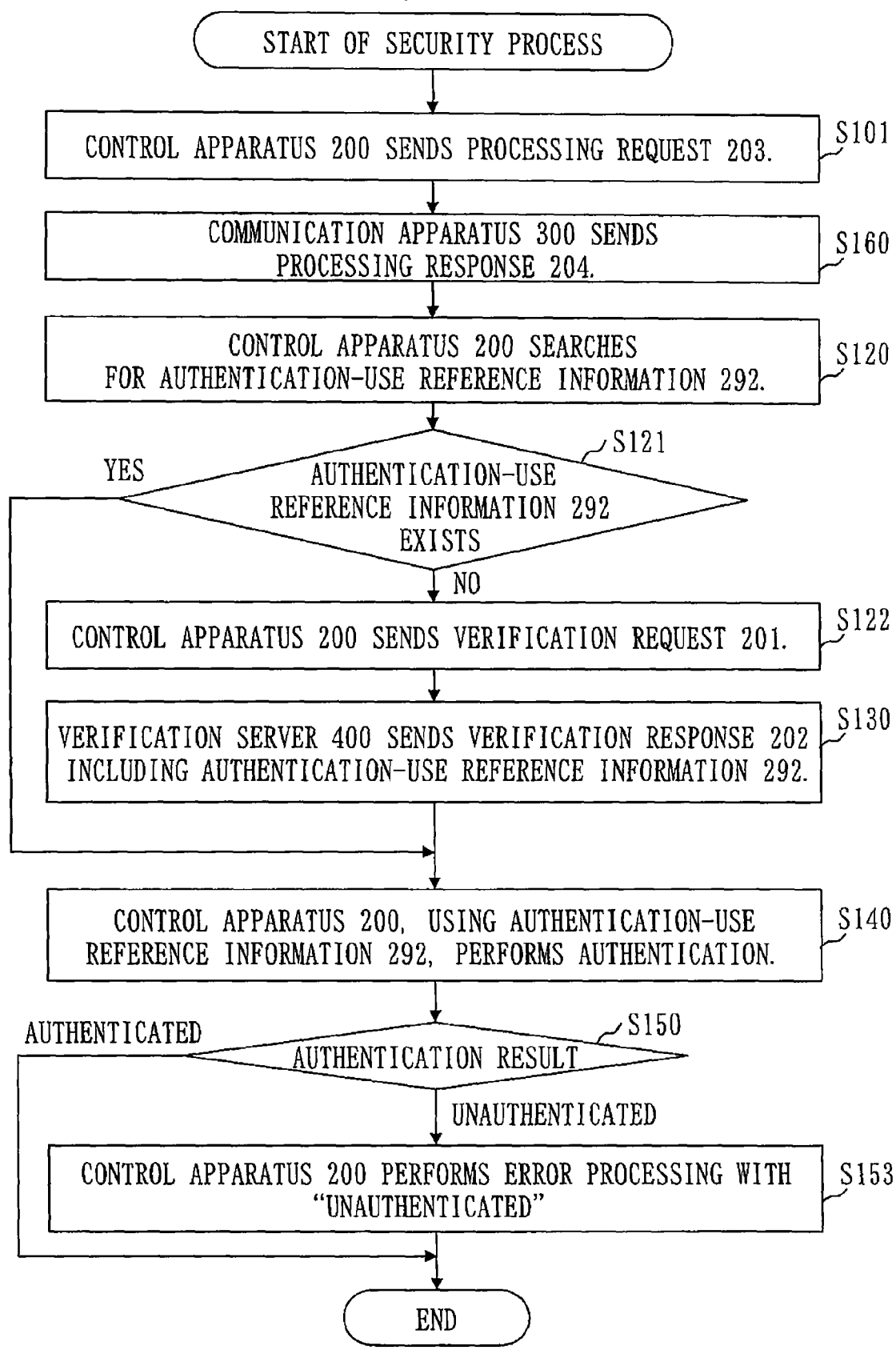
FIG. 16 is a flow chart illustrating a security process according to the second embodiment.

FIG. 16 is a flow chart illustrating a security process according to the second embodiment.

The security process of the second embodiment is discussed with reference to FIG. 16.

The security process includes S101 and S160 in the place of S110 described in the first embodiment (see FIG. 5).

The security process also includes S153 in the place of S151 and S152 described in the first embodiment.

Hereafter, S101, S160 and S153 are mainly described.

In S101, the processing requesting section 240 of the control apparatus 200 (see FIG. 15) generates the request information 205 indicating details of the requested processing which is requested to the communication apparatus 300, and generates the processing request 203 including the request information 205.

The processing requesting section 240 of the control apparatus 200 sends the processing request 203, and the request processing section 330 of the communication apparatus 300 (see FIG. 14) receives the processing request 203.

After S101, the process proceeds to S160.

In S160, the request processing section 330 of the communication apparatus 300 performs the requested processing in accordance with the request information 205 included in the processing request 203, and generates the processing result 397 of the requested processing.

The authentication-information generating section 320 of the communication apparatus 300, using the private key 394, generates the signature 396 for the processing result 397.

The request processing section 330 generates the authentication information 392 including the certificate 395, and the signature 396 for the processing result 397, and sends the processing response 204 including the authentication information 392 and the request information 205, to the control apparatus 200.

The processing requesting section 240 of the control apparatus 200 receives the processing response 204.

After S160, the process proceeds to S120.

S120 to S150 are similar to those described in the first embodiment.

In S150, when the authentication result indicates being "authenticated", the security process is terminated.

When the authentication result indicates being "unauthenticated", the process proceeds to S153.

In S153, the processing requesting section 240 of the control apparatus 200 performs predetermined error processing for an unauthenticated case.

After S153, the security process is terminated.

In the second embodiment, it is described that the control apparatus 200 performs authentication of the processing response 204 of the communication apparatus 300 instead of the processing request 301 of the communication apparatus 300.

The second embodiment can serve to achieve similar effects to those of the first embodiment.

Embodiment 3

An example of the configuration of the security system 100 is described.

Hereafter, portions which are different from those of the first embodiment and the second embodiment are mainly discussed. Portions which are not discussed here are considered to be similar to those described in the first and second embodiments.

Figure 17:
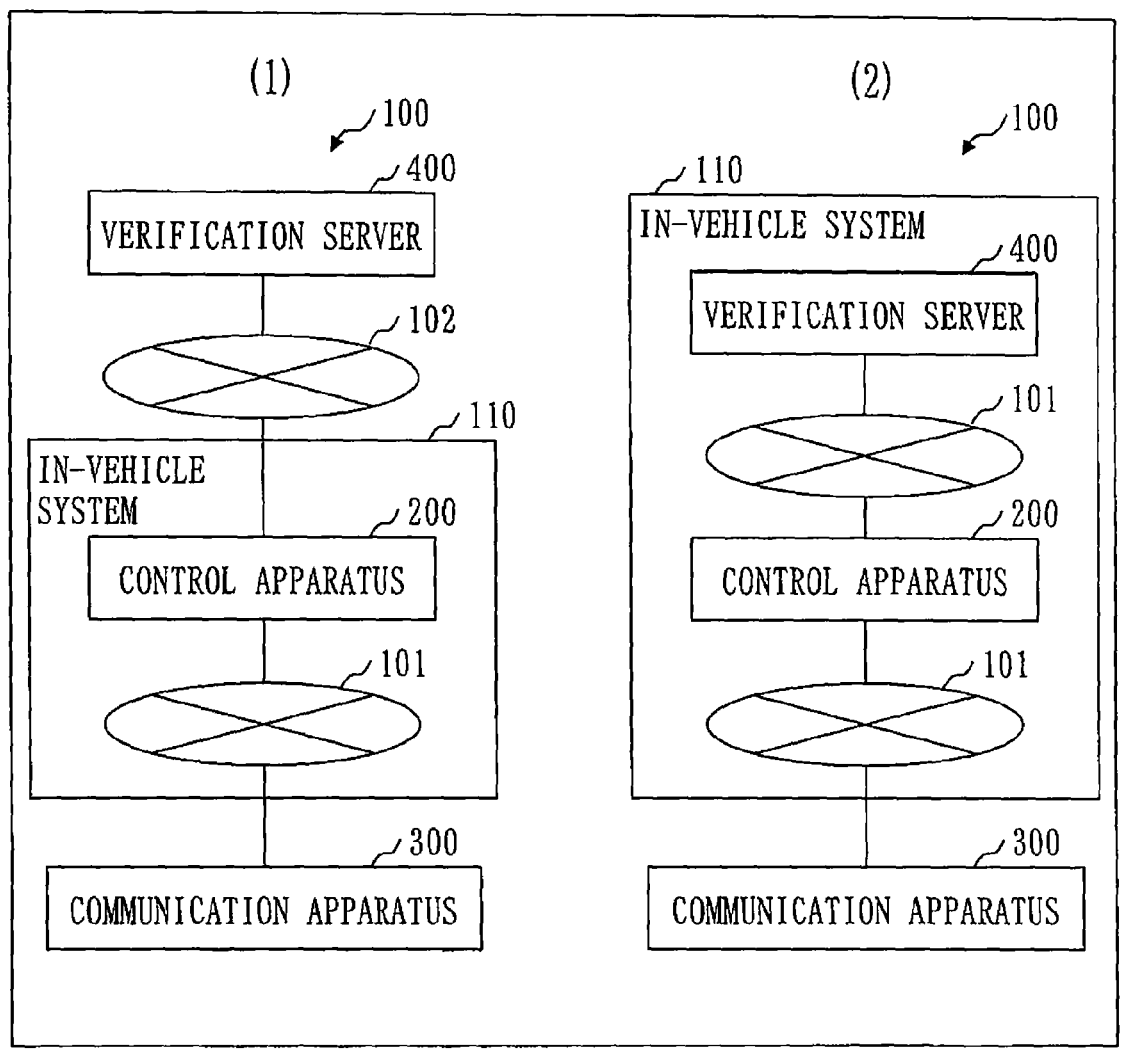
FIG. 17 illustrates an example of a configuration of the security system 100 according to a third embodiment.
Figure 18:
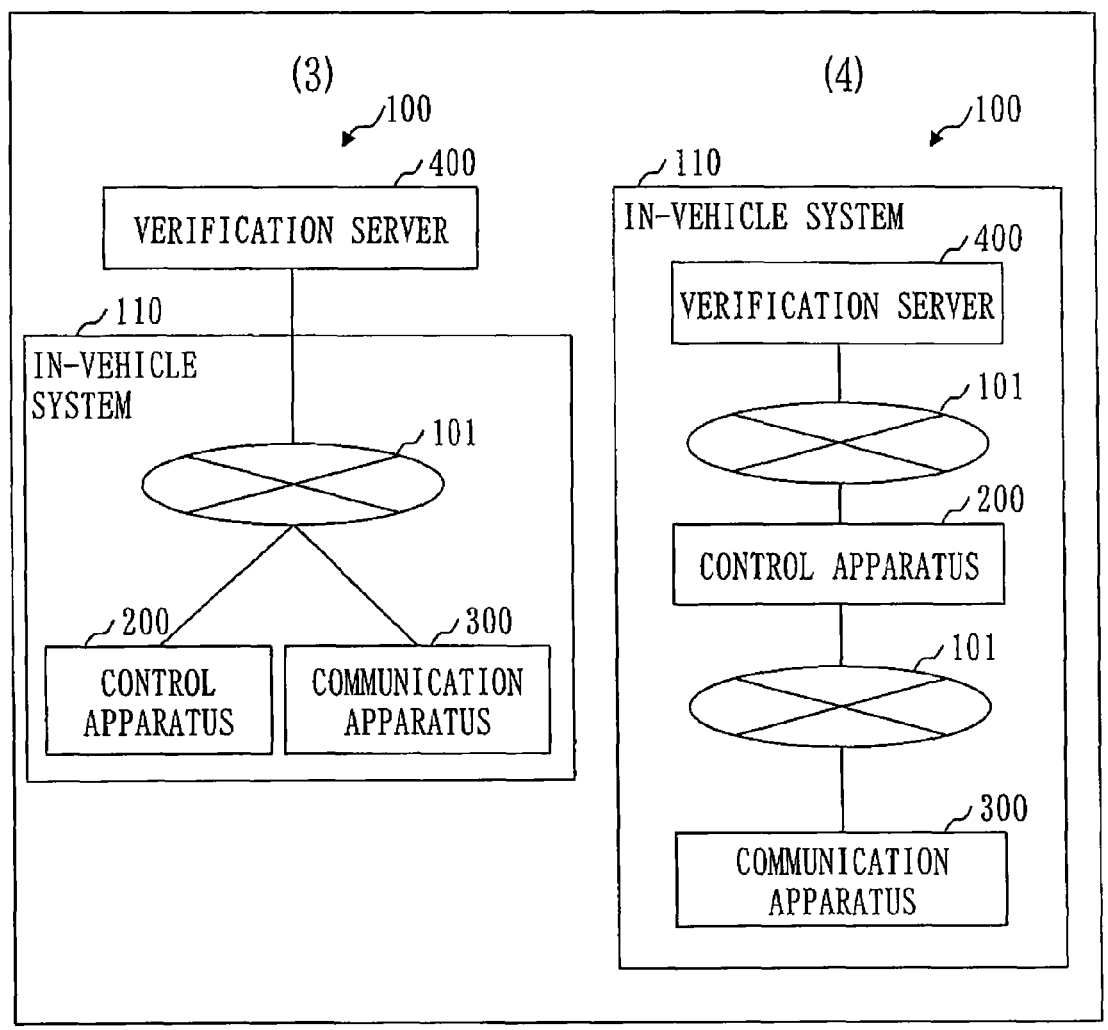
FIG. 18 illustrates an example of a configuration of the security system 100 according to the third embodiment.
Figure 19:
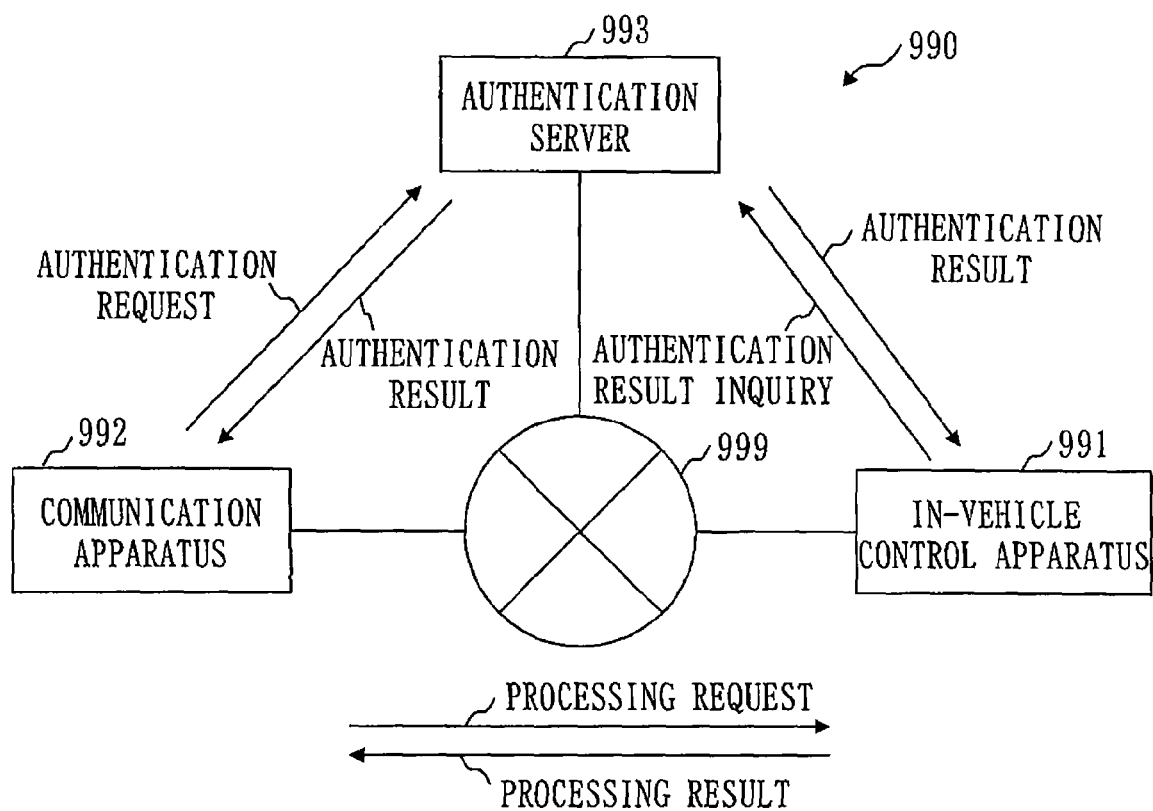
FIG. 19 is a brief overview of a configuration and processing disclosed in Patent Document 1.

FIG. 17 and FIG. 18 illustrate examples of configuration of the security system 100 according to a third embodiment.

An example of the configuration of the security system 100 of the third embodiment is described with reference to FIG. 17 or FIG. 18.

Referring to (1) in FIG. 17, the communication apparatus 300 may be a portable apparatus (e.g., a smart phone) which can be carried into the vehicle from outside, instead of the built-in apparatus which is incorporated in the in-vehicle system 110. The communication apparatus 300 may be carried into the vehicle, and used for communication with the control apparatus 200 via the in-vehicle network 101.

Referring to (2) in FIG. 17, the verification server 400 may be a built-in apparatus which is incorporated in the in-vehicle system 110. The verification server 400 is used for communication with the control apparatus 200 via the in-vehicle network 101.

Referring to (1) in FIG. 18, the verification server 400 may be a portable apparatus (e.g., a smart phone) which is carried from outside, instead of the built-in apparatus incorporated in the in-vehicle system 110. The verification server 400 is carried into the vehicle and used for communication with the control apparatus 200 via the in-vehicle network 101.

Referring to (2) in FIG. 18, both the verification server 400 and the communication apparatus 300 may be built-in apparatuses which are incorporated in the in-vehicle system 110.

The security system 100 may be configured differently from those illustrated in FIG. 1, (1) and (2) in FIG. 17, and (1) and (2) in FIG. 18.

In the third embodiment, it is described that flexible changes may be made for arrangement and connection among the control apparatus 200, the communication apparatus 300, the verification server 400 and the in-vehicle system 110.

REFERENCE SIGNS LIST

100: security system, 101: in-vehicle network, 102: external network, 110: in-vehicle system, 200: control apparatus, 201: verification request, 202: verification response, 203: processing request, 204: processing response, 205: request information, 210: request processing section, 220: authentication processing section, 230: verification requesting section, 240: processing requesting section, 290: control storing section, 291: verification request information, 292: authentication-use reference information, 293: authentication-use validity information, 294: authentication-use invalidity information, 295: verification result, 296: hash value, 297: public key, 298: validity period, 300: communication apparatus, 301: processing request, 302: processing response, 310: processing requesting section, 320: authentication-information generating section, 330: request processing section, 390: communication storing section, 391: request information, 392: authentication information, 393: certification-use information, 394: private key, 395: certificate, 396: signature, 397: processing result, 400: verification server, 410: verification processing section, 420: reference-information generating section, 490: verification storing section, 491: verification-use reference information, 901: CPU, 902: bus, 903: ROM, 904: RAM, 905: communication board, 911: display, 912: keyboard, 913: mouse, 914: drive, 920: magnetic disk drive, 921: OS, 922: programs, 923: files, 990: in-vehicle network system, 991: in-vehicle control device, 992: communication device, 993: authentication server, 999: network

The invention claimed is:

1. An authentication processing apparatus in an authentication processing system,
the authentication processing system including:
a target device that generates target information to be authenticated;
a certificate verifying apparatus that verifies an electronic certificate for the target device; and
the authentication processing apparatus that, using a verification result by the certificate verifying apparatus, authenticates the target information;
the certificate verifying apparatus receiving from the authentication processing apparatus certificate information relating to the electronic certificate for the target device, verifying whether or not the electronic certificate for the target device is valid with reference to verification-use reference information stored in advance, generating authentication-use reference information which includes the verification result, and sending the authentication-use reference information to the authentication processing apparatus;
the authentication processing apparatus comprising:
a target-information receiving circuit that receives from
the target device
the target information,
a digital signature for the target information, and
the certificate information relating to an electronic certificate issued for a target device that generates the target information;
a certificate-verification requesting circuit that sends to the certificate verifying apparatus the certificate information received by the target-information receiving circuit, and receives the authentication-use reference information from the certificate verifying apparatus;
a signature verifying circuit,
when the verification result included in the authentication-use reference information received by the certificate-verification requesting circuit indicates validity,
using a public key of the target device, which is included in the electronic certificate for the target device, and the target information received by the target-information receiving circuit,
verifies whether or not the digital signature for the target information received by the target-information receiving circuit is valid;
an authentication-use reference information storing circuit that stores the authentication-use reference information,
wherein:
the certificate-verification requesting circuit,
when the authentication-use reference information is not stored in the authentication-use reference information storing circuit,
sends the certificate information, receives the authentication-use reference information, and stores the authentication-use reference information received, in the authentication-use reference information storing circuit; and
the signature verifying circuit determines whether or not the verification result included in the authentication-use reference information stored in the authentication-use reference information storing circuit indicates validity,
wherein the authentication-use reference information includes index values,
the authentication processing apparatus further comprising:
an authentication-use reference information searching circuit that calculates a hash value of the electronic certificate for the target device, and determines whether or not the authentication-use reference information that includes an index value whose value is the same as a value of the hash value calculated is stored in the authentication-use reference information storing circuit.

2. The authentication processing apparatus of claim 1, wherein:
the authentication-use reference information includes validity period information which indicates a validity period, and the signature verifying circuit,
when the verification result included in the authentication-use reference information indicates validity, and the verification result is within the validity period indicated by the validity period information included in the authentication-use reference information,
verifies whether or not the digital signature for the target information is valid.

3. An authentication processing system comprising:
a target device that generates target information to be authenticated;
a certificate verifying apparatus that verifies an electronic certificate for the target device; and
the authentication processing apparatus that, using a verification result by the certificate verifying apparatus, authenticates the target information;
the certificate verifying apparatus receiving from the authentication processing apparatus certificate information relating to the electronic certificate for the target device, verifying whether or not the electronic certificate for the target device is valid with reference to verification-use reference information stored in advance, generating authentication-use reference information which includes the verification result, and sending the authentication-use reference information to the authentication processing apparatus;
the authentication processing apparatus comprising:
target-information receiving circuit that receives from the target device
the target information,
a digital signature for the target information, and
the certificate information relating to an electronic certificate issued for a target device that generates the target information;
a certificate-verification requesting circuit that sends to the certificate verifying apparatus the certificate information received by the target-information receiving circuit, and receives the authentication-use reference information from the certificate verifying apparatus;
a signature verifying circuit,
when the verification result included in the authentication-use reference information received by the certificate-verification requesting circuit indicates validity,
using a public key of the target device, which is included in the electronic certificate for the target device, and the target information received by the target-information receiving circuit,
verifies whether or not the digital signature for the target information received by the target-information receiving circuit is valid;
an authentication-use reference information storing circuit that stores the authentication-use reference information,
wherein:
the certificate-verification requesting circuit,
when the authentication-use reference information is not stored in the authentication-use reference information storing circuit,
sends the certificate information, receives the authentication-use reference information, and stores the authentication-use reference information received, in the authentication-use reference information storing circuit; and
the signature verifying circuit determines whether or not the verification result included in the authentication-use reference information stored in the authentication-use reference information storing circuit indicates validity;
wherein the authentication-use reference information includes index values,
the authentication processing apparatus comprising:
an authentication-use reference information searching circuit that calculates a hash value of the electronic certificate for the target device, and determines whether or not the authentication-use reference information that includes an index value whose value is the same as a value of the hash value calculated is stored in the authentication-use reference information storing circuit.

4. An authentication processing method for an authentication processing apparatus in an authentication processing system,
the authentication processing system including:
a target device that generates target information to be authenticated;
a certificate verifying apparatus that verifies an electronic certificate for the target device; and
the authentication processing apparatus that, using a verification result, authenticates the target information;
the certificate verifying apparatus receiving from the authentication processing apparatus certificate information relating to the electronic certificate for the target device, verifying whether or not the electronic certificate for the target device is valid with reference to verification-use reference information stored in advance, generating authentication-use reference information which includes the verification result, and sending the authentication-use reference information to the authentication processing apparatus;
the authentication processing method comprising:
receiving from the target device
the target information, a digital signature for the target information, and the certificate information;
sending to the certificate verifying apparatus the certificate information received;
receiving from the certificate verifying apparatus the authentication-use reference information;
when the verification result included in the authentication-use reference information received indicates validity,
verifying, by using a public key of the target device included in the electronic certificate for the target device and the target information received, whether or not the digital signature for the target information received is valid,
storing the authentication-use reference information,
wherein:
when the authentication-use reference information is not stored in the authentication-use reference information storing circuit,
sending the certificate information, receives the authentication-use reference information, and stores the authentication-use reference information received, in the authentication-use reference information storing circuit;
determining whether or not the verification result included in the authentication-use reference information stored in the authentication-use reference information storing circuit indicates validity;
wherein the authentication-use reference information includes index values,
calculating a hash value of the electronic certificate for the target device, and determining whether or not the authentication-use reference information that includes an index value whose value is the same as a value of the hash value calculated is stored in the authentication-use reference information storing circuit.

5. A non-transitory computer readable medium including an authentication processing program causing a computer to execute the authentication processing method of claim 4.

\* \* \* \* \*